(12) United States Patent
Seta et al.

(10) Patent No.: US 9,746,919 B2
(45) Date of Patent: Aug. 29, 2017

(54) INFORMATION PROCESSING DEVICE AND INFORMATION PROCESSING METHOD

(71) Applicant: SONY CORPORATION, Tokyo (JP)

(72) Inventors: Kenichi Seta, Kanagawa (JP);
Masatoshi Ueno, Kanagawa (JP);
Masato Noguchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 110 days.

(21) Appl. No.: 14/561,669

(22) Filed: Dec. 5, 2014

(65) Prior Publication Data

US 2015/0169051 A1    Jun. 18, 2015

(30) Foreign Application Priority Data

Dec. 13, 2013 (JP) ................ 2013-258267

(51) Int. Cl.
*G06F 3/01* (2006.01)
*G06F 9/44* (2006.01)
*G06F 9/445* (2006.01)

(52) U.S. Cl.
CPC .............. *G06F 3/013* (2013.01); *G06F 3/011* (2013.01); *G06F 9/445* (2013.01); *G06F 9/4443* (2013.01)

(58) Field of Classification Search
CPC .......... G09G 3/006; G09G 2320/0242; G09G 2320/0693; G09G 2320/0666; G09G 2320/0673
See application file for complete search history.

(56) References Cited

U.S. PATENT DOCUMENTS

| 2010/0220897 A1* | 9/2010 | Ueno ................ G06K 9/00208 382/115 |
| 2010/0251168 A1* | 9/2010 | Fujita .................. G06F 3/0488 715/790 |
| 2012/0256967 A1* | 10/2012 | Baldwin ................ G06F 3/013 345/684 |

FOREIGN PATENT DOCUMENTS

| JP | 2009-094840 A | 4/2009 |
| JP | 2009-124413 A | 6/2009 |

* cited by examiner

*Primary Examiner* — Shaheda Abdin
(74) *Attorney, Agent, or Firm* — Chip Law Group

(57) ABSTRACT

There is provided an information processing device including an application information acquisition unit which acquires a position of a window on a display screen, and a control unit which terminates an application of a window whose position acquired by the application information acquisition unit satisfies a predetermined condition.

17 Claims, 15 Drawing Sheets

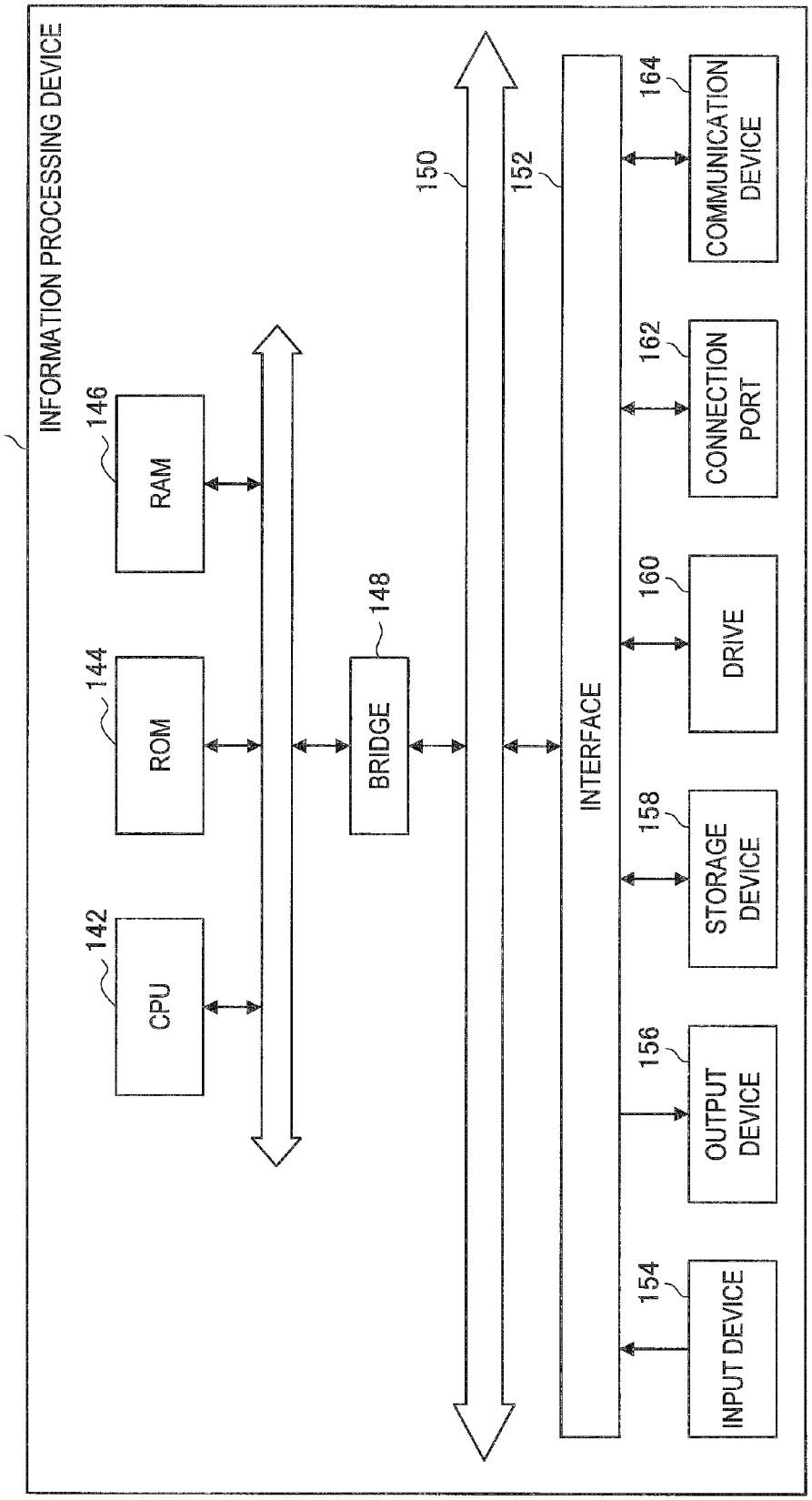

INFORMATION PROCESSING DEVICE AND INFORMATION PROCESSING METHOD

CROSS REFERENCE TO RELATED APPLICATIONS

This application claims the benefit of Japanese Priority Patent Application JP 2013-258267 filed Dec. 13, 2013, the entire contents of which are incorporated herein by reference.

BACKGROUND

The present disclosure relates to an information processing device and an information processing method.

In recent years, it is common to place a multiwindow system in an information apparatus and the like. In the multiwindow system, a plurality of applications are started, and a plurality of windows relating to the plurality of applications may be displayed. However, when a large number of applications are started in parallel, the starting time may increase.

On the other hand, JP 2009-094840A and JP 2009-124413A disclose that when a user's action or the position of a user is detected, a part of starting processing is executed before the starting operation by a user is executed, so that time for completing the starting processing from the starting operation is shortened.

SUMMARY

However, according to the disclosure of JP 2009-094840A and the disclosure of JP 2009-124413A, the starting time is shortened. However, when a large number of applications are started, windows relating to the applications are displayed, which may deplete the computational resource of an information apparatus and the like.

Thus, the present disclosure has proposed novel and improved information processing device and information processing method capable of automatically releasing a computational resource of applications according to the positions of windows of the applications.

According to an embodiment of the present disclosure, there is provided an information processing device including an application information acquisition unit which acquires a position of a window on a display screen, and a control unit which terminates an application of a window whose position acquired by the application information acquisition unit satisfies a predetermined condition.

According to another embodiment of the present disclosure, there is provided an information processing device including an application information acquisition unit which acquires input device information which shows an input device having usability to an application, a user state acquisition unit which acquires a position of a user, and a control unit which terminates an application for which an input device shown by the input device information acquired by the application information acquisition unit is judged to be an input device which is unsuitable for use by a user based on the position of the user acquired by the user state acquisition unit.

According to another embodiment of the present disclosure, there is provided an information processing method including acquiring a position of a window on a display screen, and terminating an application of a window of which the acquired position satisfies a predetermined condition.

According to another embodiment of the present disclosure, there is provided an information processing method including acquiring input device information which shows an input device having usability to an application, acquiring a position of a user, and terminating an application for which an input device shown by the input device information to be acquired is judged to be an input device which is unsuitable for use by a user based on the acquired position of the user.

As described above, according to one or more of the embodiments of the present disclosure, the information processing device and the information processing method which may automatically release the computational resource of applications according to the positions of windows of the applications are provided. Note that the present disclosure is not limited to the effect stated above and in addition to or in place of the effect stated above, may achieve any of the effects indicated in this specification or effects that can be understood from the specification.

BRIEF DESCRIPTION OF THE DRAWINGS

FIG. 15 is a diagram for explaining the hardware configuration of an information processing device according to an embodiment of the present disclosure.

DETAILED DESCRIPTION OF THE EMBODIMENTS

Figure 1:
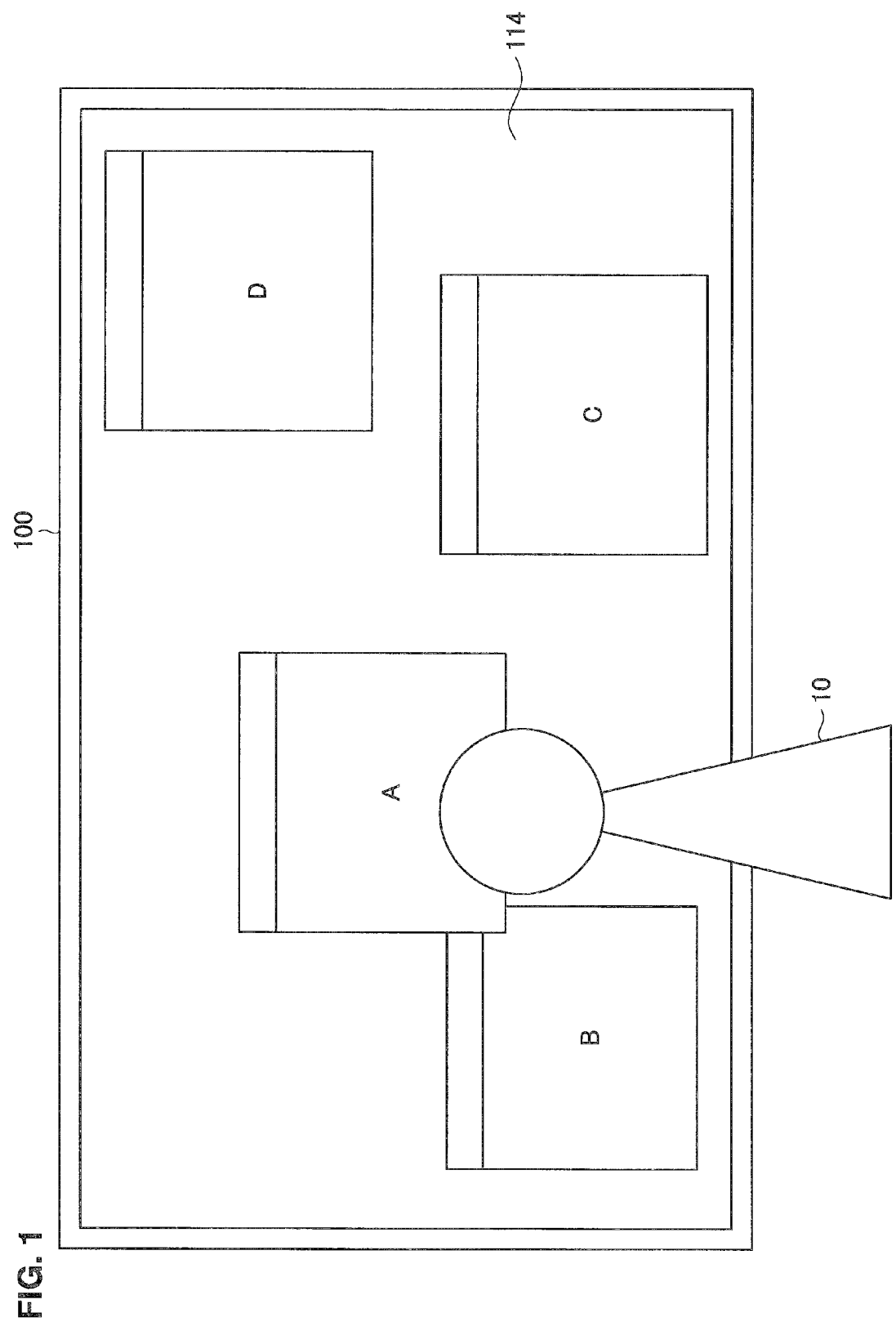
FIG. 1 is a view for explaining the outline of an information processing device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description is given in the following order:
1. Outline of Information Processing Device according to One Embodiment of Present Disclosure
2. First Embodiment (Example of Processing based on Position of Window and Position of User)
2-1. Configuration of Information Processing Device according to First Embodiment
2-2. Processing of Information Processing Device according to First Embodiment
2-3. Modification in First Embodiment
3. Second Embodiment (Example of Processing Executed in response to User's State Change)
3-1. Configuration of Information Processing Device according to Second embodiment
3-2. Processing of Information Processing Device according to Second embodiment
3-3. Modification in Second Embodiment
4. Third Embodiment (Example of Processing based on User's Identification Information)
4-1. Configuration of Information Processing Device according to Third embodiment
4-2. Processing of Information Processing Device according to Third Embodiment
4-3. Modification in Third Embodiment
5. Hardware Configuration of Information Processing Device according to One Embodiment of Present Disclosure
6. Conclusion

1. Outline of Information Processing Device According to One Embodiment of Present Disclosure First, the outline of an information processing device according to one embodiment of the present disclosure is described with reference to FIG. 1. FIG. 1 is a view for explaining the outline of the information processing device according to one embodiment of the present disclosure.

An information processing device 100 has an application management function of bringing a plurality of applications into operation in parallel. The application management function allocates a part of the computational resource to each application, and performs starting and management of the plurality of applications. The information processing device 100 further has a window management function of generating, displaying, and managing windows relating to the applications. Therefore, the information processing device 100 may display the windows relating to the plurality of applications on a separately provided display unit 114. The computational resource allocated to the application having a window is released after the window is closed and the application is terminated. The information processing device 100 further has a user state detection function. The user's state may be the position of a user, the direction of a user's gaze, the direction of a user's body, or the like, for example. Therefore, the information processing device 100 may grasp the user's state.

For example, as illustrated in FIG. 1, the information processing device 100 may display windows A to D relating to the applications on the display unit 114. Moreover, the information processing device 100 may grasp that a user 10 is located in front of a window A displayed by the display unit 114 of the information processing device 100.

Herein, whenever the window is started, a part of the computational resource is allocated to the corresponding application. Therefore, when another windows is newly and continuously started without closing the window, the computational resource may be depleted. Furthermore, when a plurality of windows are started, there is a possibility that the visibility and the operability of a display screen may decrease. Then, the information processing device 100 terminates the application relating to the window specified based on the position of the user and the position of the window. Specifically, the information processing device 100 terminates the application in which the distance from the position of a window to the position of the user is longer than the distance from the position of each of the other windows to the position of the user.

For example, as illustrated in FIG. 1, when the computational resource is depleted, the information processing device 100 acquires the position of the user 10 and the position of each of the windows A to D. Next, the information processing device 100 calculates the distance from the position of the user 10 to the position of each of the windows A to D, and selects the window D in which the calculated distance is longer than the calculated distance about each of the other windows A to C. Then, the information processing device 100 terminates the application relating to the selected window D.

Thus, the information processing device 100 according to one embodiment of the present disclosure terminates the application in which the distance from the position of the window to the position of the user 10 is longer than the distance from the position of each of the other windows to the position of the user 10. Therefore, the application in which a possibility of being used by the user 10 is lower than the possibility of the other applications is likely to be terminated. Thus, the computational resource may be released without reducing the convenience of the user 10. In FIG. 1, a television receiving set is illustrated as an example of the information processing device 100 but the information processing device 100 may be a digital signage device, a personal computer, or the like. For convenience of the description, information processing devices 100 according to First to Third embodiments are distinguished by giving the number corresponding to the embodiments to the end, respectively, e.g., an information processing device 100-1 to an information processing device 100-3.

2. First Embodiment (Example of Processing Based on Position of Window and Position of User)

Figure 2:
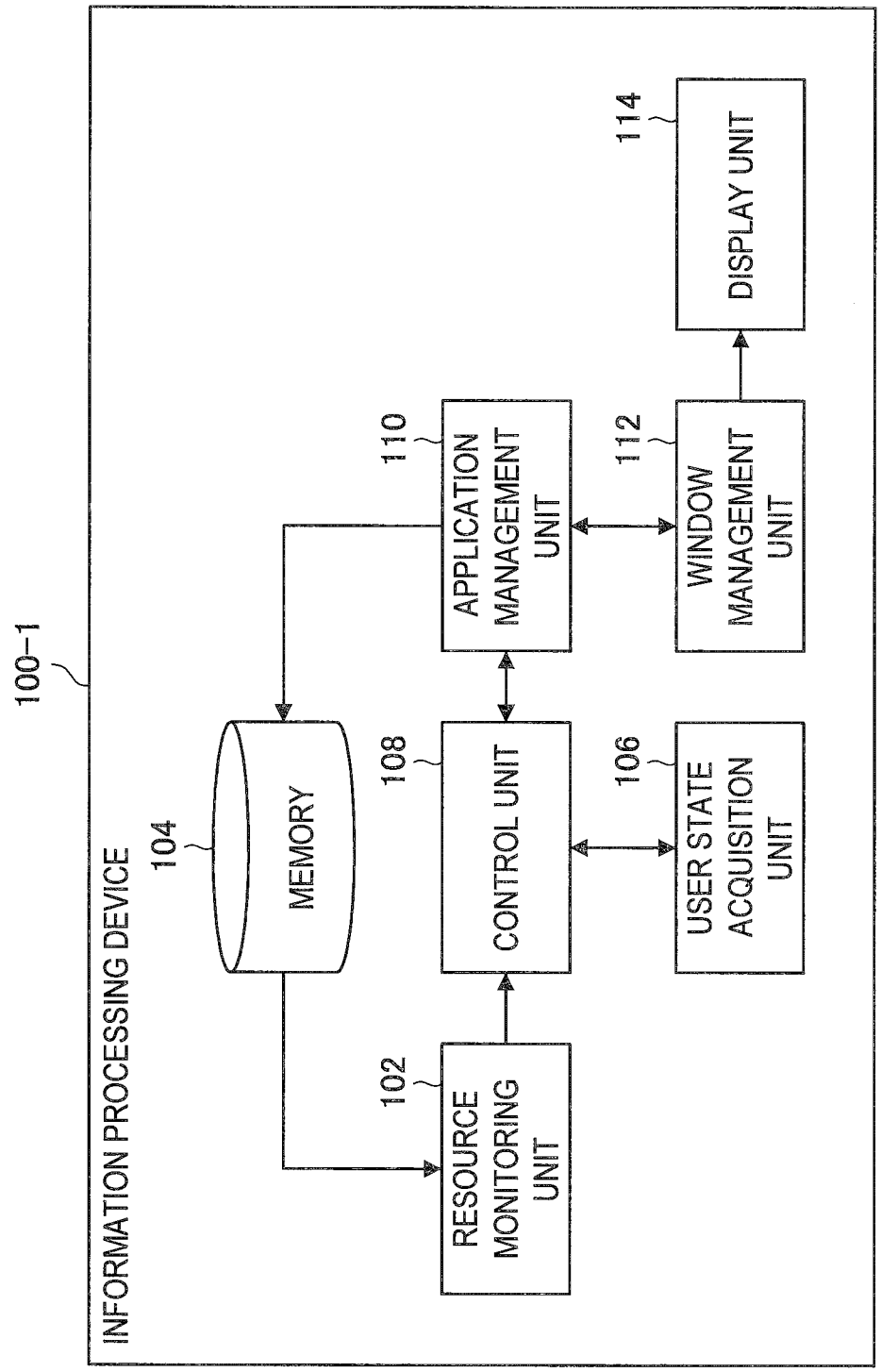
FIG. 2 is a block diagram illustrating the schematic functional configuration of an information processing device according to a first embodiment of the present disclosure.

2-1. Configuration of Information Processing Device According to First Embodiment The outline of the information processing device 100 according to one embodiment of the present disclosure is described above. Next, the configuration of an information processing device 100-1 according to a first embodiment of the present disclosure is described with reference to FIG. 2. FIG. 2 is a block diagram illustrating the schematic functional configuration of the information processing device 100-1 according to the first embodiment of the present disclosure.

As illustrated in FIG. 2, the information processing device 100-1 has a resource monitoring unit 102, a memory 104, a user state acquisition unit 106, a control unit 108, an application management unit 110, a window management unit 112, and a display unit 114.

The resource monitoring unit 102 monitors the used state of the computational resource of the information processing device 100-1. Specifically, when the resource monitoring unit 102 acquires the used state of the computational resource and the used state of the computational resource satisfies the predetermined conditions, the resource monitoring unit 102 provides a processing starting instruction to the control unit 108. For example, when the resource monitoring unit 102 acquires the used amount of the memory from the memory 104, and then the available memory does not reach the predetermined rate, the resource monitoring unit 102 provides a processing starting instruction to the control unit 108.

The memory 104 stores information on applications. Moreover, the memory 104 provides information, such as the used amount of the memory, upon request from the resource monitoring unit 102.

The user state acquisition unit 106 acquires the position of the user. Specifically, the user state acquisition unit 106 acquires the position of a user present around the information processing device 100-1. For example, the user state acquisition units 106 may be a sensor, such as an infrared sensor, an ultrasonic sensor, or a microwave sensor. The above description gives an example that the user state acquisition unit 106 is a sensor but the user state acquisition unit 106 may be a communication unit which acquires the position of the user from a device and the like provided outside the information processing device 100-1. Moreover, the user state acquisition unit 106 may be an analysis unit which analyzes an image obtained by imaging of an imaging unit separately provided in the information processing device 100-1 to acquire the position of the user. Therefore, the position of the user may be acquired without providing a sensor in the information processing device 100-1.

Figure 3:
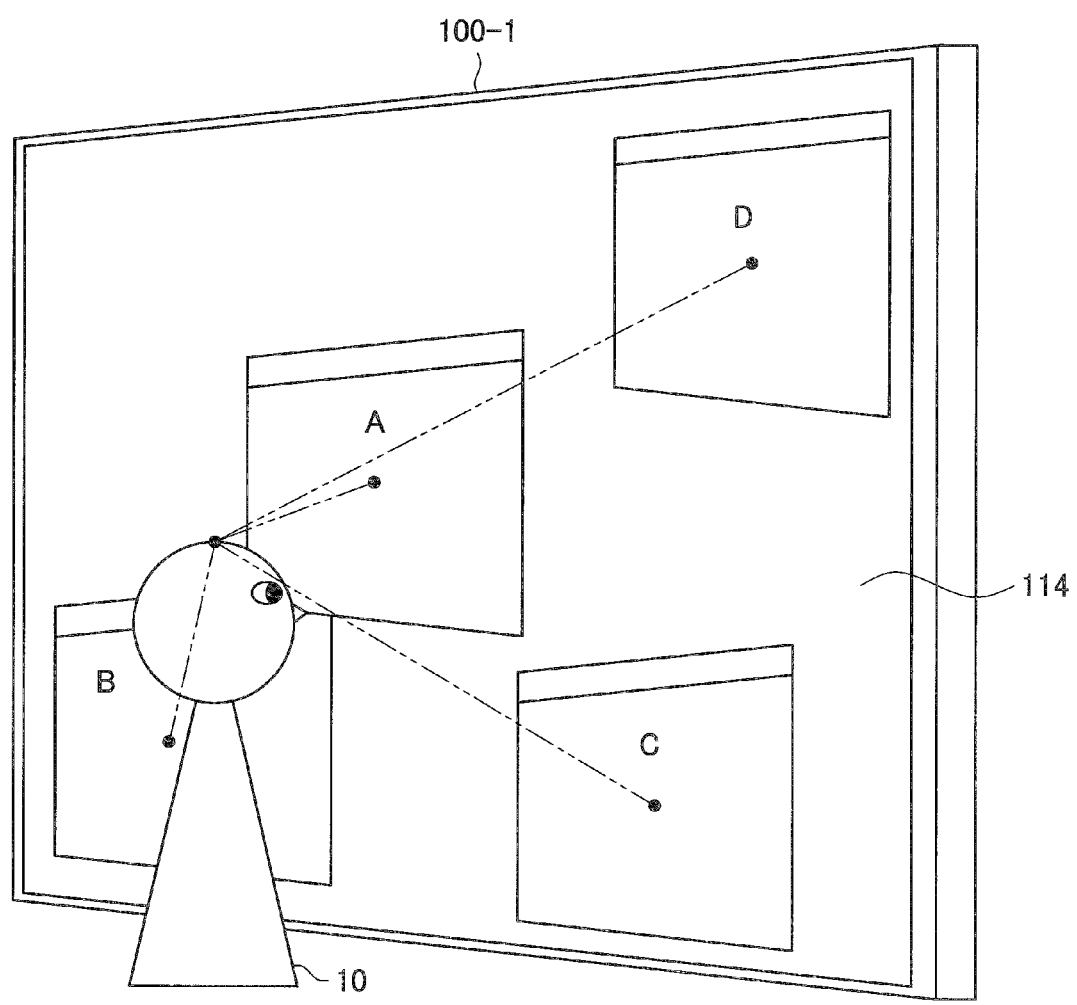
FIG. 3 is a view for explaining the relationship between the position of a user and the position of a window in the first embodiment of the present disclosure.

The control unit 108 terminates an application relating to a window specified based on the position of the user and the position of the window. Specifically, the control unit 108 terminates an application relating to a window in which the distance from the position of the window acquired from the window management unit 112 through the application management unit 110 to the position of the user acquired by the user state acquisition unit 106 is longer than a distance to be compared. For example, the distance to be compared may be the distance from the position of the user to the positions of the other windows. For example, an example of the distance to be compared described above is described with reference to FIG. 3. FIG. 3 is a view for explaining the relationship between the position of the user and the positions of the windows in the first embodiment of the present disclosure.

First, the display unit 114 displays windows relating to applications. For example, the display unit 114 may display windows A to D as illustrated in FIG. 3.

Next, the user state acquisition unit 106 acquires the position of the user 10 based on an instruction of the control unit 108. For example, the user state acquisition unit 106 may acquire a parietal region of the user 10 as the position of the user as illustrated in FIG. 3.

Next, the control unit 108 acquires the positions of the windows from the window management unit 112 through the application management unit 110, and then terminates an application relating to a window in which the distance from the position of the user to the position of the window is longer than the distance from the position of the user to the positions of the other windows. For example, as illustrated in FIG. 3, the control unit 108 requests the application management unit 110 to provide the positions of the windows. Then, the application management unit 110 may acquire the positions of the windows A to D from the window management unit 112, and then may provide the positions to the control unit 108. Then, the control unit 108 calculates the distance from the acquired position of the user 10 to each of the acquired positions of the windows A to D about each of the windows A to D, and may terminate an application relating to the window D in which the calculated distance is longer than the calculated distance about each of the other windows A to C. The description above gives an example in which the control unit 108 selects and terminates one application but the control unit 108 may select and terminate a plurality of applications. For example, as illustrated in FIG. 3, the control unit 108 may select the window D and the window C in which the calculated distance is the next longest after the window D, and may terminate the applications relating to the window C and the window D.

The description above gives an example in which the distance to be compared is the distance from the position of the user to the positions of the other windows but the distance to be compared may be a predetermined distance. In this case, a plurality of applications in which the calculated distance is longer than the predetermined distance may be terminated at once.

Herein, returning to the description of the configuration of the information processing device 100-1 with reference to FIG. 2, the application management unit 110 performs starting and termination of applications, information management, and the like as an example of an application information acquisition unit. Specifically, the application management unit 110 terminates applications based on an instruction of the control unit 108. In this case, the application management unit 110 provides an instruction of deleting a window relating to an application to be terminated to the window management unit 112. Furthermore, the application management unit 110 terminates an application and also causes the memory 104 to delete information on the application to be terminated therefrom. Moreover, the application management unit 110 acquires the position of a window relating to the application from the window management unit 112 upon request from the control unit 108, and then provides the acquired position of the window to the control unit 108.

The window management unit 112 manages generation, deletion, and the like of windows relating to applications. Specifically, the window management unit 112 deletes a window based on a window deleting instruction from the application management unit 110. Moreover, the window management unit 112 provides the positions of the windows to the application management unit 110.

The display unit 114 displays windows generated by the window management unit 112.

2-2. Processing of Information Processing Device According to First Embodiment

Figure 4:
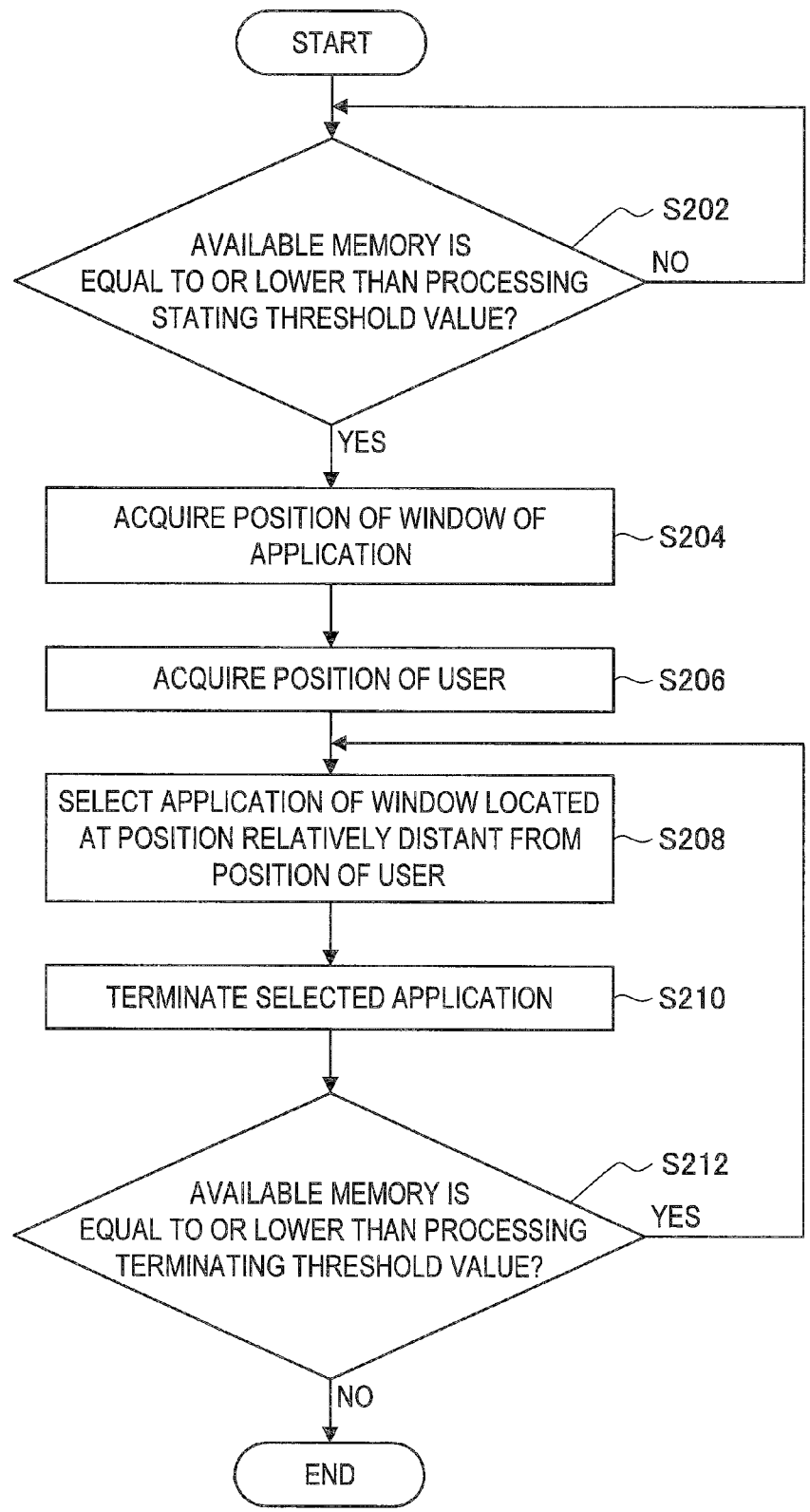
FIG. 4 is a flow chart conceptually illustrating the processing of the information processing device in the first embodiment of the present disclosure.

Next, the processing of the information processing device 100-1 in the first embodiment of the present disclosure is described with reference to FIG. 4. FIG. 4 is a flow chart conceptually illustrating the processing of the information processing device 100-1 in the first embodiment of the present disclosure. A description duplicated with the description of the configuration of the information processing device 100-1 described above is omitted.

First, the control unit 108 stands by until the available memory becomes equal to or lower than a processing starting threshold value (Step S202). Specifically, when the resource monitoring unit 102 detects that the available memory becomes equal to or lower than the processing starting threshold value, the resource monitoring unit 102 provides a processing starting instruction to the control unit 108. For example, the processing starting threshold value may be a numerical value of 5% of the available memory.

In Step S202, when the available memory becomes equal to or lower than the processing starting threshold value, the control unit 108 acquires the positions of windows of applications (Step S204). Specifically, the control unit 108 acquires the position of each window displayed on the display unit 114 from the window management unit 112 through the application management unit 110.

Next, the control unit 108 acquires the position of a user (Step S206). Specifically, the control unit 108 provides an instruction of acquiring the position of the user to the user state acquisition unit 106. Then, the user state acquisition unit 106 acquires the position of the user based on the instruction, and then provides the acquired position of the user to the control unit 108.

Next, the control unit 108 selects an application of a window located at a position relatively distant from the position of the user (Step S208). Specifically, the control unit 108 calculates the distance from the acquired position of the user to each of the positions of windows, and then selects an application of a window in which the calculated distance is longer than each of the calculated distances about the other windows.

Next, the control unit 108 terminates the selected application (Step S210). Specifically, the control unit 108 provides an instruction of terminating the selected application to the application management unit 110, and then the application management unit 110 terminates the application based on the instruction. When the application is accompanied by a window, the application management unit 110 provides an instruction of deleting the window relating to the application to the window management unit 112, and then the window management unit 112 deletes the window based on the instruction.

Next, the control unit 108 judges whether or not the available memory is equal to or lower than the processing terminating threshold value (Step S212). Specifically, the control unit 108 inquires to the resource monitoring unit 102 about the available memory. Then, when the available memory provided from the resource monitoring unit 102 is equal to or lower than the processing terminating threshold value, the processing returns to Step S208. When the available memory is higher than the processing terminating threshold value, the control unit 108 terminates the processing. The processing terminating threshold value is a value larger than the processing starting threshold value. For example, the processing terminating threshold value may be a numerical value of 10% of the available memory. Thus, by setting the processing terminating threshold value to be larger than the processing starting threshold value, it may be prevented that the application terminating processing frequently occurs.

Thus, according to the first embodiment of the present disclosure, the information processing device 100-1 terminates the application relating to the window in which the distance from the position of the user to the position of the window is longer than the distance from the position of the user to the position of each of the other windows. Therefore, the application in which a possibility of being used by the user is lower than the possibility of the other applications is likely to be terminated. Thus, the computational resource may be released without reducing user's convenience.

2-3. Modification in First Embodiment

The first embodiment of the present disclosure is described above. This embodiment is not limited to the above-described example. Hereinafter, First to Fourth modifications of this embodiment are described.

(First Modification)

Figure 5:
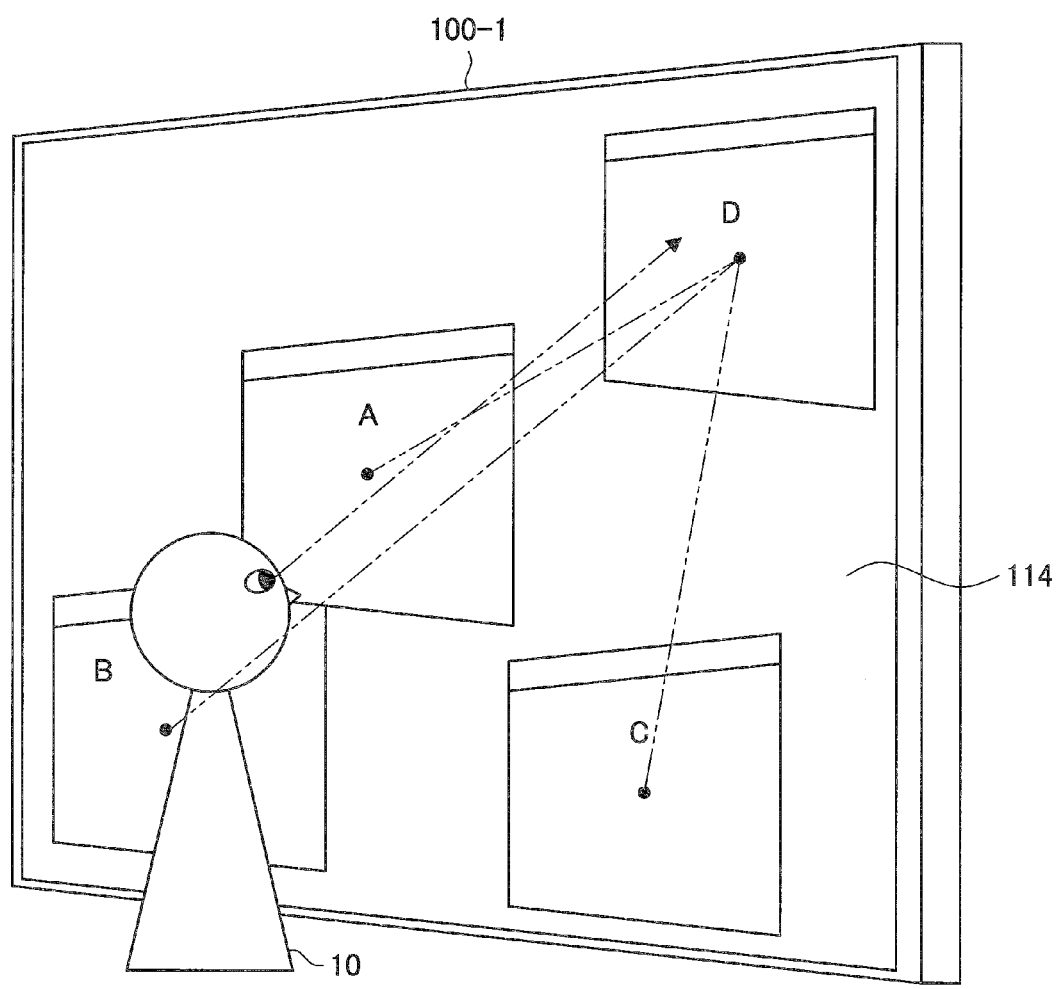
FIG. 5 is a view for explaining the relationship between the visual position of a user and the position of a window in the first embodiment of the present disclosure.

As a first modification of this embodiment, the user state acquisition unit 106 may furthermore acquire the direction of a user's gaze and the control unit 108 may terminate an application relating to a window specified based on the position of the window and the visual position specified from the position of the user and the direction of a user's gaze. Specifically, the control unit 108 terminates an application relating to a window in which the distance from the position of the window to the visual position specified from the position of the user and the direction of a user's gaze acquired by the user state acquisition unit 106 is longer than a distance to be compared. For example, the distance to be compared may be the distance from the visual position to the positions of the other windows. For example, this modification is described with reference to FIG. 5. FIG. 5 is a view for explaining the relationship between the visual position of the user and the positions of the windows in the first embodiment of the present disclosure.

First, the display unit 114 displays windows relating to applications. For example, the display unit 114 may display windows A to D as illustrated in FIG. 5.

Next, the user state acquisition unit 106 acquires the position of the user 10 and the direction of a gaze of the user 10 based on the instruction of the control unit 108. For example, as illustrated in FIG. 5, the user state acquisition unit 106 acquires a parietal region of the user 10 as the position of the user, and further acquires the direction of a gaze of the user 10.

Next, the control unit 108 terminates an application relating to a window in which the distance from the position of the window to the visual position specified from the acquired position of the user and direction of a user's gaze is longer than the distance from the visual position to the positions of the other windows. For example, as illustrated in FIG. 5, the control unit 108 may grasp that the user 10 views the window D from the acquired position of the user and direction of a gaze of the user 10. Then, the control unit 108 calculates the distance from the position of the window D to each of the positions of the other windows A to C, and then may terminate the application relating to the window B in which the calculated distance is longer than the calculated distance about the windows A and C. The description above gives an example in which the control unit 108 selects and terminates one application but the control unit 108 may select and terminate a plurality of applications. For example, as illustrated in FIG. 5, the control unit 108 selects the window B and the window A in which the calculated distance is the second longest after the window B, and then may terminate the applications relating to the window B and the window A. Moreover, for the acquisition of the direction of a user's gaze, a common gaze detection method, such as a method of analyzing a motion of the iris in an image obtained by imaging, may be used, for example.

Figure 6:
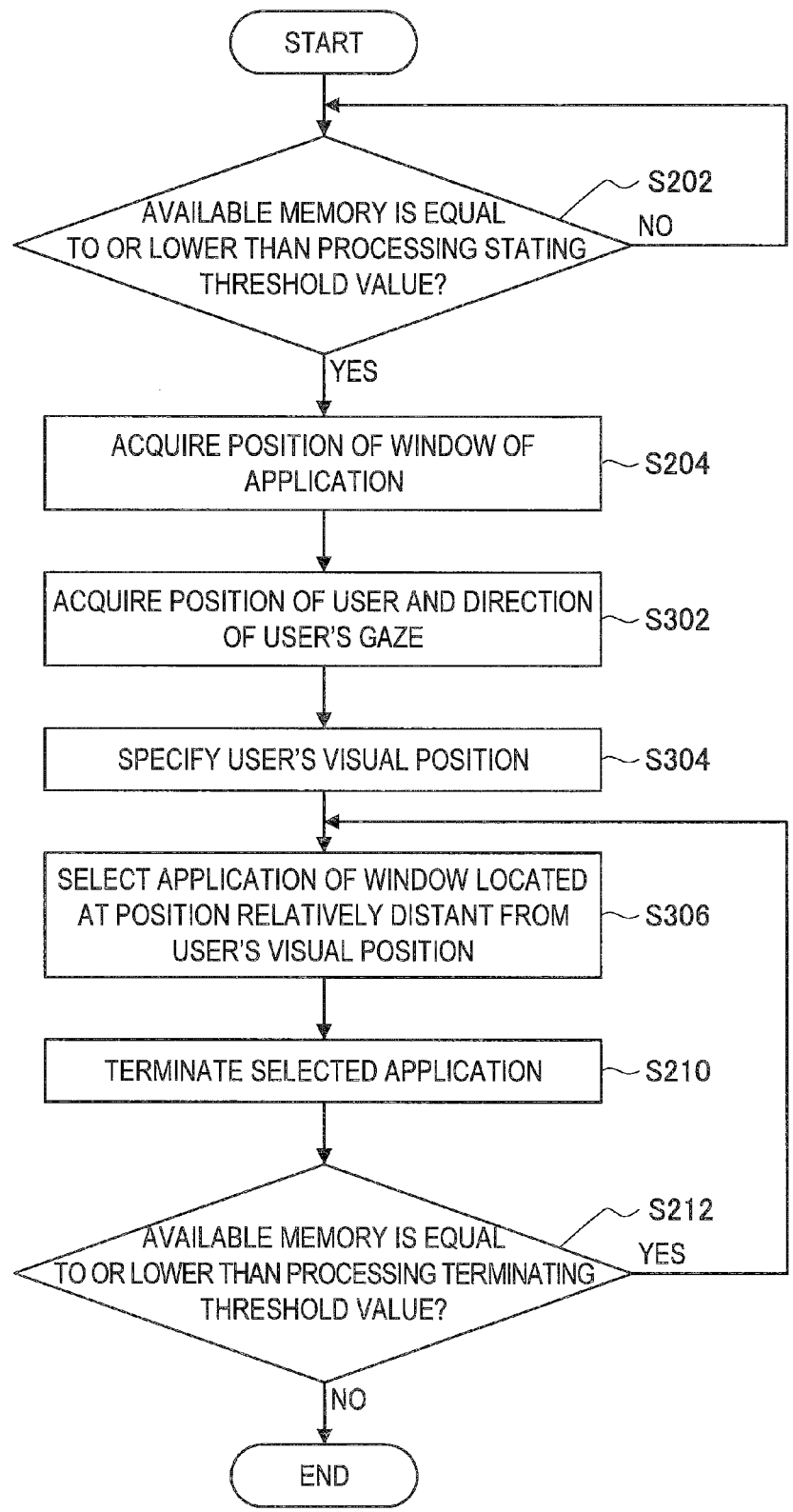
FIG. 6 is a flow chart conceptually illustrating the processing of an information processing device in a first modification of the first embodiment of the present disclosure.

Then, the processing of this modification is described with reference to FIG. 6. FIG. 6 is a flow chart conceptually illustrating the processing of the information processing device 100-1 in the first modification of the first embodiment of the present disclosure. A description duplicated with the description of the above-described first embodiment is omitted.

The control unit 108 acquires the position of the user and the direction of a user's gaze after the processing of each of Step S202 and Step S204 (Step S302). Specifically, the control unit 108 provides an instruction of acquiring the position of the user and the direction of a user's gaze to the user state acquisition unit 106. Then, the user state acquisition unit 106 acquires the position of the user and the direction of a user's gaze based on the instruction, and then provides the acquired position of the user and direction of a user's gaze to the control unit 108.

Next, the control unit 108 specifies the visual position of the user (Step S304). Specifically, the control unit 108 specifies the position of the window which is judged to be viewed from the acquired position of the user and direction of a user's gaze.

Next, the control unit 108 selects the application of the window located at a position relatively distant from the visual position of the user (Step S306). Specifically, the control unit 108 selects an application in which the distance from the position of the window which is judged to be viewed to one window is longer than the distance from the position of the window which is judged to be viewed to the positions of the other windows.

The processing proceeds to Step S210 after the processing of Step S306. Thus, according to the first modification of this embodiment, the control unit 108 terminates the application relating to the window in which the distance from the position of the window to the visual position specified from the position of the user and the direction of a user's gaze is longer than the distance from the visual position to the positions of the other windows. Therefore, the application which is not viewed by the user is terminated, so that the computational resource may be released without reducing user's convenience.

The description above gives an example in which the distance to be compared is the distance from the visual position to the positions of the other windows but the distance to be compared may be a predetermined distance. In this case, a plurality of applications in which the calculated distance is longer than the predetermined distance may be terminated at once.

(Second Modification)

Figure 7:
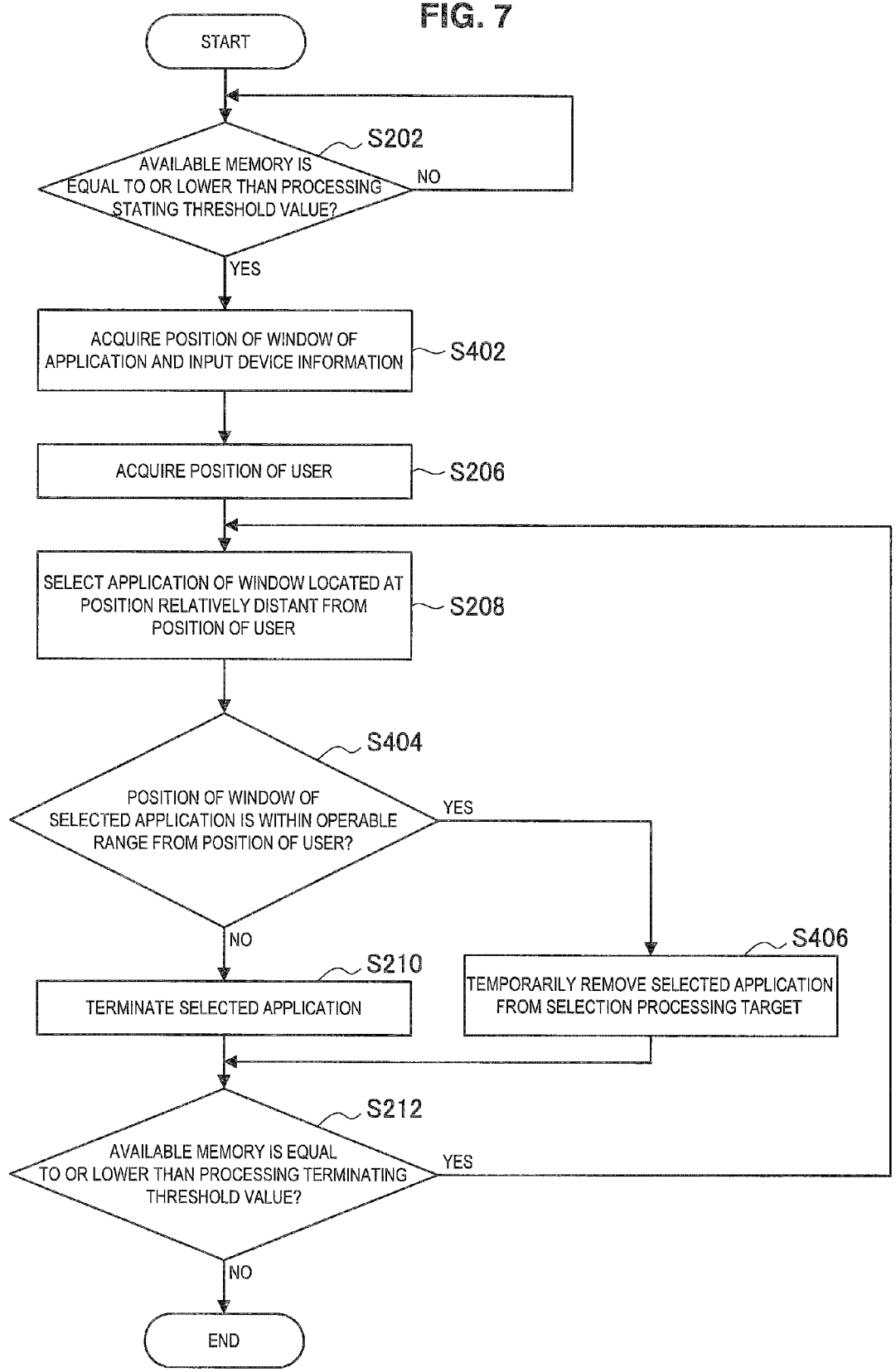
FIG. 7 is a flow chart conceptually illustrating the processing of an information processing device in a second modification of the first embodiment of the present disclosure.

As a second modification of this embodiment, the control unit 108 may terminate an application to which an input device has usability is an input device which is unsuitable for the use of a user. Specifically, the application management unit 110 further acquires input device information which shows an input device having usability to an application from the memory 104. Then, the control unit 108 further judges whether or not the input device shown by the input device information acquired from the application management unit 110 is an input device which is unsuitable for the use of a user based on the position of the window and the position of the user, and then adds the judgment result to the application terminating conditions. For example, the input device may be a touch panel, a gesture input device, a mouse, a keyboard, or the like. The input device having usability to an application is stored in the memory 104 as one of the application information, for example, when starting the application. A more specific description is given with reference to FIG. 7. FIG. 7 is a flow chart conceptually illustrating the processing of the information processing device 100-1 in the second modification of the first embodiment of the present disclosure. A description duplicated with the description of the above-described first embodiment is omitted.

In Step S202, when the available memory becomes equal to or lower than the processing starting threshold value, the control unit 108 acquires the position of the window and the input device information relating to the application (Step S402). Specifically, the control unit 108 provides the position of the window and an instruction of acquiring the input device information to the application management unit 110. The application management unit 110 acquires the position of the window from the window management unit 112 based on the instruction and also acquires the input device information from the memory 104. Then, the application management unit 110 provides the acquired position of the window and input device information to the control unit 108.

After the processing of each of Step S402, Step S206, and Step S208, the control unit 108 judges whether or not the position of the window of the selected application is within the range where the application may be operated from the position of the user (Step S404). Specifically, the control unit 108 acquires an operable distance which is coordinated to each input device beforehand from the memory 104 based on the input device shown by the acquired input device information. Then, the control unit 108 judges whether or not the distance from the position of the window of the selected application to the position of the user is shorter than the distance.

When it is judged that the position of the window of the selected application is within the range where the application may be operated from the position of the user in Step S404, the control unit 108 temporarily removes the selected application from the selection processing target (Step S406). Specifically, the control unit 108 does not terminate the selected application but temporarily removes the selected application from the selection processing target in Step S208 in order to select another application. The application temporarily removed from the selection processing target is set to the selection processing target again when next starting the processing of the flow chart.

When it is judged that the position of the window of the selected application is not within the range where the application may be operated from the position of the user in Step S404, the processing proceeds to Step S210. After the processing of Step S406, the processing proceeds to Step S212.

Thus, according to the second modification of this embodiment, the control unit 108 terminates an application to which an input device has usability is an input device which is unsuitable for the use of a user. Therefore, the application which may not or is difficult to allow a user's input operation is terminated, so that the computational resource may be released without reducing user's convenience.

The description above gives an example in which the control unit 108 performs processing of terminating the application specified based on the input device information of the application, the position of the window, and the position of the user but the control unit 108 may perform processing of terminating the application specified based on the input device information of the application and the position of the user. Specifically, the control unit 108 judges whether or not the distance from the position of the user to the information processing device 100-1 is shorter than the operable distance of the input device shown by the input device information of the application. Then, when it is judged that the distance is longer than the operable distance, the control unit 108 terminates the application. Therefore, the necessity of performing the processing of acquiring the position of the window is eliminated, so that the processing speed of the information processing device 100-1 may improve and the computational resource for use in the processing may be reduced.

(Third Modification)

As a third modification of this embodiment, the control unit 108 may not judge whether or not an application which satisfies predetermined exclusion conditions satisfies application terminating conditions. Specifically, the control unit 108 judges whether or not the application satisfies the predetermined exclusion conditions stored in the memory 104. Then, when it is judged that the application satisfies the exclusion conditions, the application is set as an application which is not to be subjected to application terminating judging processing. The application falling under the predetermined exclusion conditions may be, for example, an application displayed on the front rather than the other applications, an application of reproducing contents, such as moving images or music, and the like. The predetermined exclusion conditions may be set beforehand by the information processing device 100-1 or may be set beforehand by the user.

Thus, according to the third modification of this embodiment, the control unit 108 sets the application which satisfies the predetermined exclusion conditions as an application which is not to be subjected to the judgment processing of judging whether or not the application satisfies the application terminating conditions. Therefore, the termination of an application which is not directly operated or browsed by the user but is to be operated is prevented and user's convenience may be maintained.

(Fourth Modification)

As a fourth modification of this embodiment, the control unit 108 may preferentially terminate an application whose window is displayed behind the other windows among applications which satisfy the application terminating conditions. Specifically, the control unit 108 acquires the front-rear relationship of the display of windows together with the positions of windows from the application management unit 110. Then, the control unit 108 selects applications to be terminated, and then terminates an application relating to a window displayed behind windows relating to the other selected applications among windows relating to the selected applications.

Thus, according to the fourth modification of this embodiment, the control unit 108 preferentially terminates an application whose window is displayed behind the other windows among applications which satisfy the application terminating conditions. Therefore, an application relating to a window which may not be viewed by the user or is difficult to be viewed by the user is terminated, whereby the computational resource can be released without impairing user's convenience.

3. Second Embodiment (Example of Processing Executed in Response to User's State Change)

The first embodiment of the present disclosure is described above. Next, a second embodiment of the present disclosure is described. In the second embodiment of the present disclosure, an information processing device 100-2 performs the application terminating judging processing in response to a user's state change.

Figure 8:
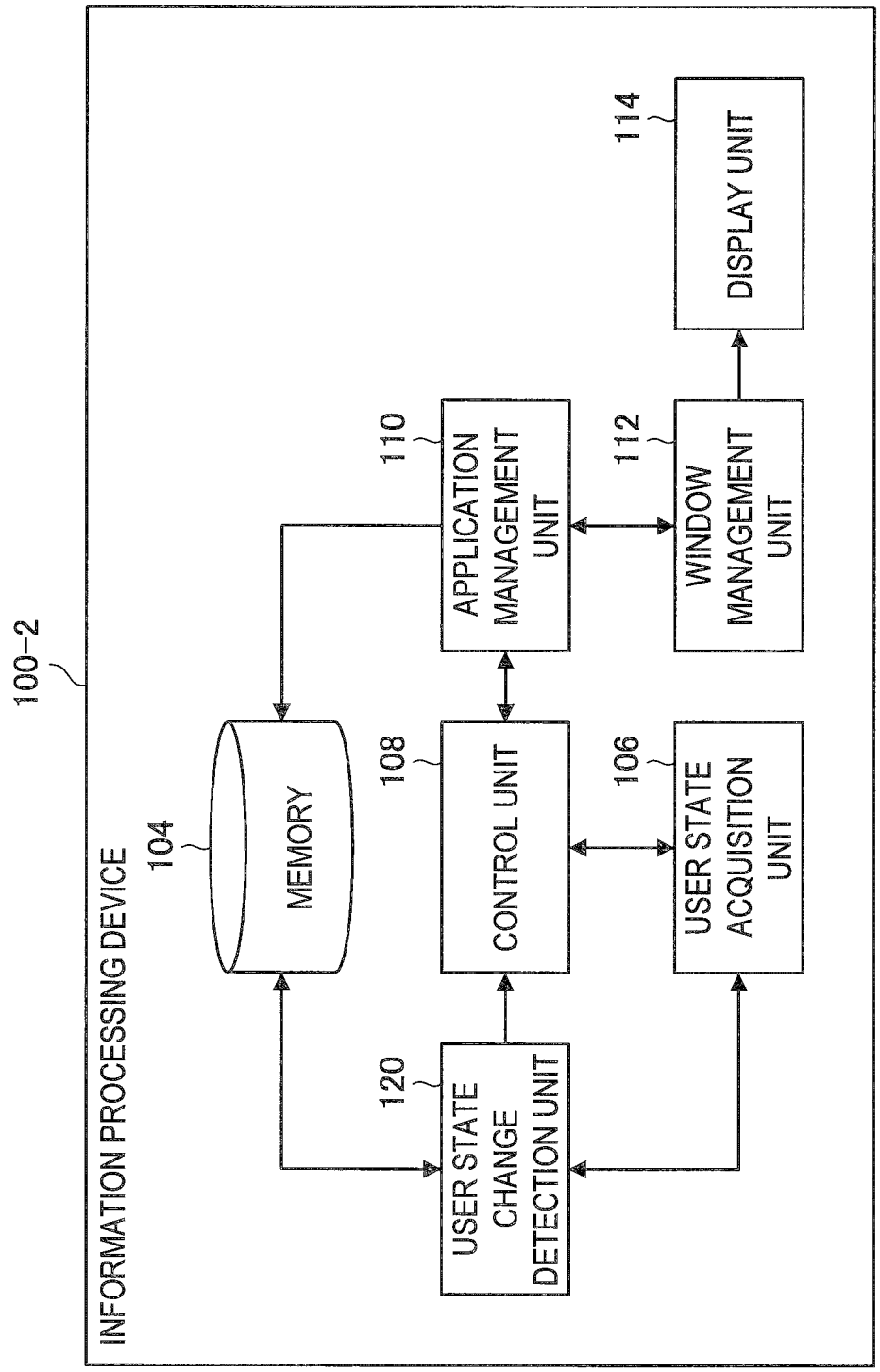
FIG. 8 is a block diagram illustrating the schematic functional configuration of an information processing device according to a second embodiment of the present disclosure.

3-1. Configuration of Information Processing Device According to Second Embodiment First, the configuration of the information processing device 100-2 according to the second embodiment of the present disclosure is described with reference to FIG. 8. FIG. 8 is a block diagram illustrating the schematic functional configuration of the information processing device 100-2 according to the second embodiment of the present disclosure. A description of a configuration substantially the same as the configuration of the information processing device 100-1 according to the first embodiment of the present disclosure is omitted.

As illustrated in FIG. 8, the information processing device 100-2 further has a user state change detection unit 120 in addition to the memory 104, the user state acquisition unit 106, the control unit 108, the application management unit 110, the window management unit 112, and the display unit 114.

The user state change detection unit 120 detects a change in the position of the user. Specifically, the user state change detection unit 120 periodically provides an instruction of acquiring the position of the user to the user state acquisition unit 106, and then acquires the position of the user acquired by the user state acquisition unit 106. Then, the user state change detection unit 120 causes the memory 104 to store the acquired position of the user. Next, the user state change detection unit 120 acquires a previous position of the user stored in the memory 104, and then judges whether or not the position of the user has changed based on the position of the user and the previous position of the user acquired by the user state acquisition unit 106. When it is judged that the position of the user has changed, the user state change detection unit 120 provides a processing starting instruction to the control unit 108. For example, the user state change detection unit 120 may detect that the position of the user has moved in a vertical direction with respect to the display surface of the display unit 114. The change in the position of the user to be detected may be not only a change in a vertical direction with respect to the display surface but a change in both a vertical direction and a horizontal direction. The position of the user to be stored in the memory 104 may be overwritten or a plurality of positions of the user may be stored without being overwritten.

The description above gives an example in which the user state change detection unit 120 periodically detects a change in the position of a user but the user state change detection unit 120 may detect the change in the position of the user based on the generated events and the like. For example, the user state change detection unit 120 may detect a change in the position of the user in response to additional starting of an application. Therefore, a change in the position of the user is detected according to the generated events and the like, whereby the computational resource can be released according to the situation of the information processing device 100-2.

Figure 9:
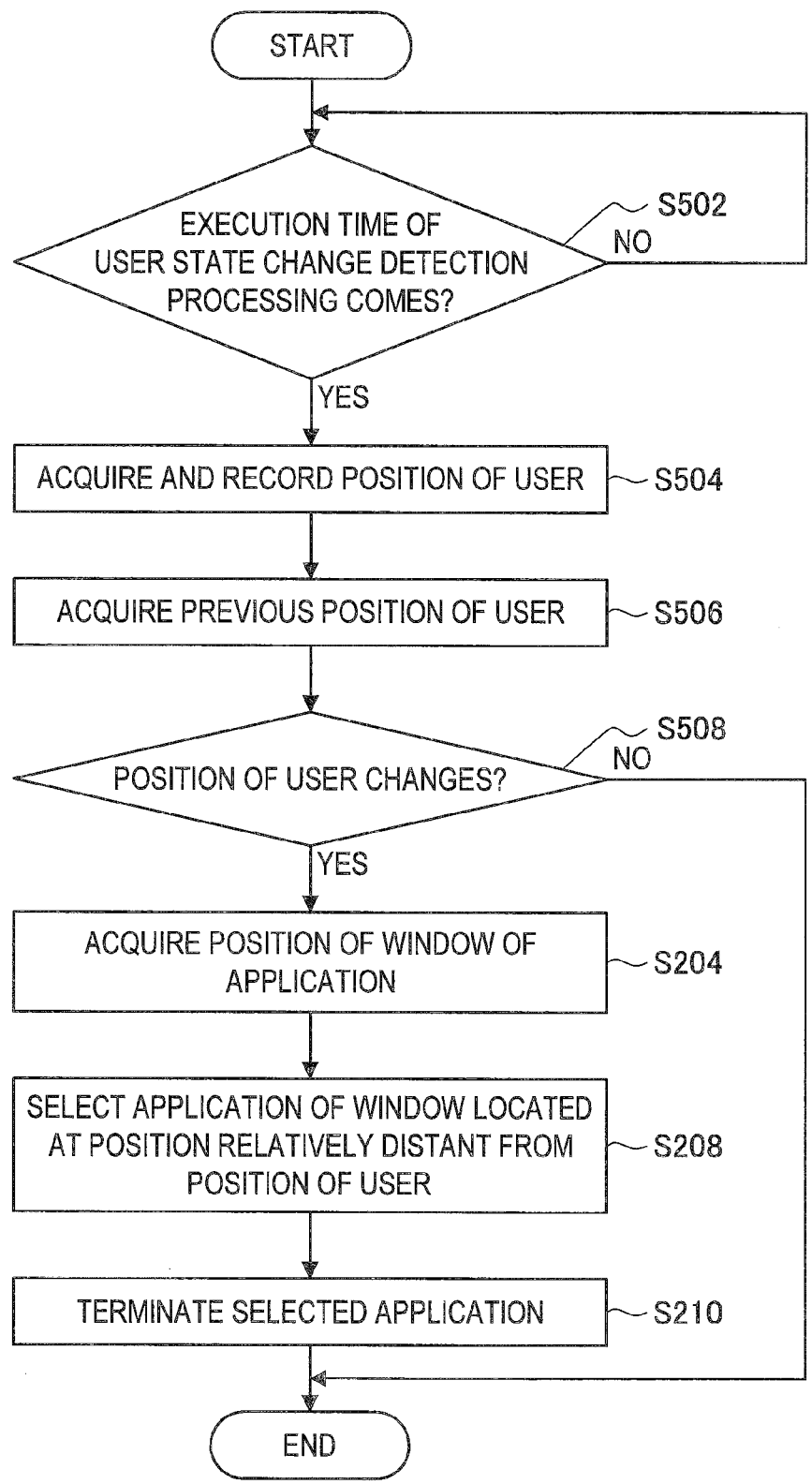
FIG. 9 is a flow chart conceptually illustrating the processing of the information processing device in the second embodiment of the present disclosure.

3-2. Processing of Information Processing Device According to Second Embodiment Next, the processing of the information processing device 100-2 in the second embodiment of the present disclosure is described with reference to FIG. 9. FIG. 9 is a flow chart conceptually illustrating the processing of the information processing device 100-2 in the second embodiment of the present disclosure. A description duplicated with the description of the above-described first embodiment and the description of the configuration of the information processing device 100-2 is omitted.

First, the user state change detection unit 120 stands by until the execution time of the user state change detection processing comes (Step S502). Specifically, the user state change detection unit 120 stands by until predetermined time passes from the execution time of the previous user state change detection processing.

In Step S502, when the execution time of the user state change detection processing comes, the user state change detection unit 120 acquires and records the position of the user (Step S504). Specifically, the user state change detection unit 120 acquires the position of the user from the user state acquisition unit 106, and then causes the memory 104 to store the acquired position of the user.

Next, the user state change detection unit 120 acquires a previous position of the user (Step S506). Specifically, the user state change detection unit 120 acquires the position of the user previously stored in the memory 104.

Next, the user state change detection unit 120 judges whether or not the position of the user has changed (Step S508). Specifically, the user state change detection unit 120 compares the acquired position of the user and the acquired previous position of the user, and then judges whether or not the position of the user has changed. For example, the user state change detection unit 120 may judge a change in the position of the user based on changes in the coordinates corresponding to the position of the user, for example. For the judgment of the change in the position of the user, the threshold value of the change amount may be used. For example, the user state change detection unit 120 judges that the position of the user has changed when the distance of the user's change is larger than a predetermined distance. Therefore, the change in the position of the user whose change amount is smaller than the threshold value is treated as "no change", which can prevent the termination of applications caused by frequently performing the application terminating judging processing.

When it is judged that the position of the user has changed in Step S508, the control unit 108 judges that the execution of the application terminating judging processing is to be performed, and then performs processing of each of Step S204 to Step S210.

When it is judged that the position of the user has not changed in Step S508, the control unit 108 judges that the execution of the application terminating judging processing is not to be performed, and then terminates the processing.

Thus, according to the second embodiment of the present disclosure, the information processing device 100-2 performs the application terminating judging processing when the position of the user changes. Therefore, the computational resource can be released according to the application used state of the user. Moreover, applications are terminated irrespective of the used state of the computational resource, whereby a depletion of the computational resource can be suppressed.

3-3. Modification in Second Embodiment

The second embodiment of the present disclosure is described above. This embodiment is not limited to the above-described example. Hereinafter, First to Third modifications of this embodiment are described.

(First Modification)

Figure 10:
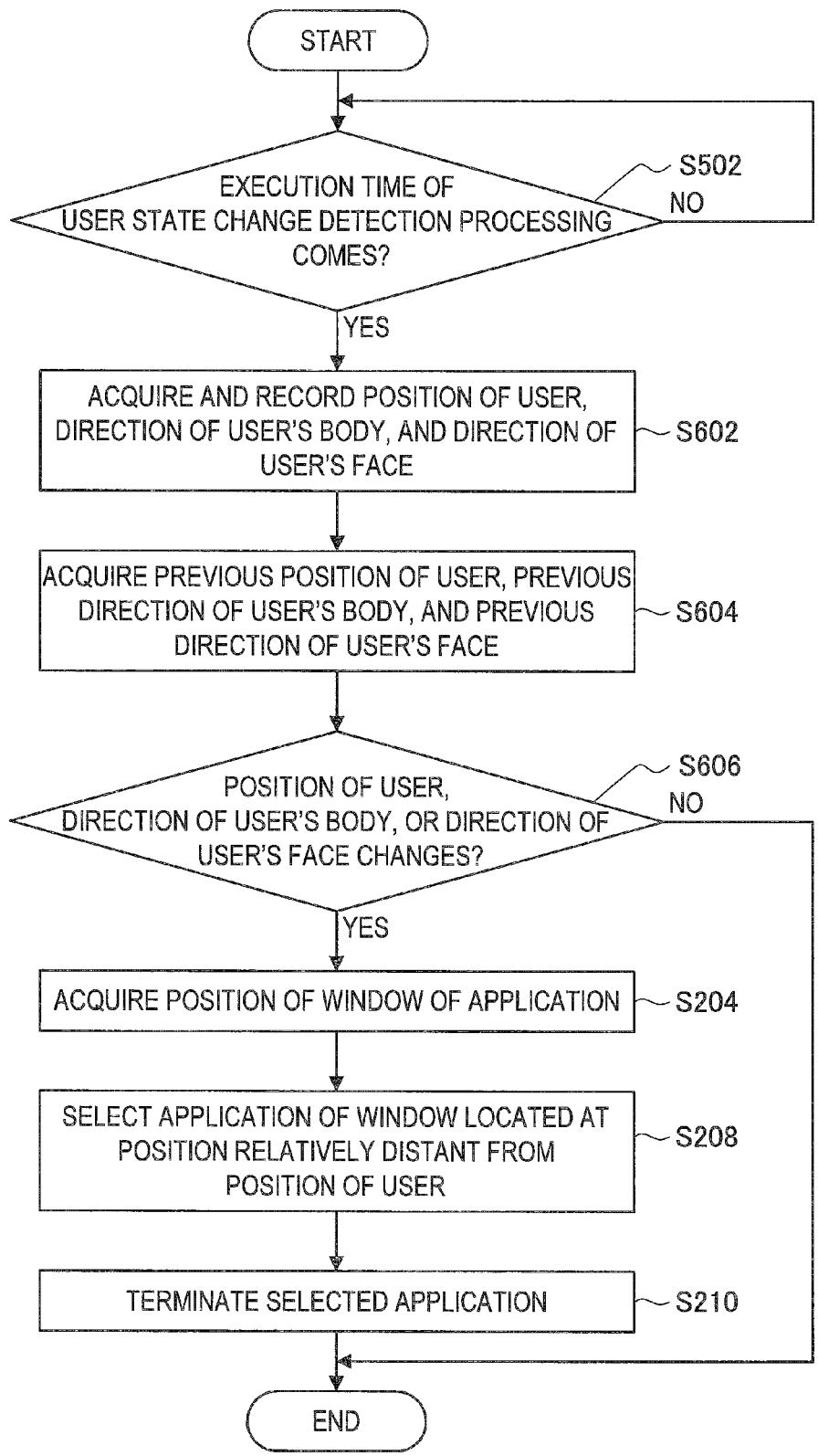
FIG. 10 is a flow chart conceptually illustrating the processing of an information processing device in a first modification of the second embodiment of the present disclosure.

As a first modification of this embodiment, the control unit 108 may judge whether or not the application terminating judging processing is performed based on the direction of a user's body or the direction of a user's face. Specifically, the user state acquisition unit 106 further acquires information on the direction of a user's body or the direction of a user's face and the control unit 108 judges a necessity for execution of the judgment of whether or not an application satisfies the application terminating conditions based on the change in the direction of a user's body or the direction of a user's face acquired by the user state acquisition unit 106. A more specific description is given with reference to FIG. 10. FIG. 10 is a flow chart conceptually illustrating the processing of the information processing device 100-2 in the first modification of the second embodiment of the present disclosure. A description duplicated with the description of the first and second embodiments described above is omitted.

The user state change detection unit 120 acquires and records the position of the user, the direction of a user's body, and the direction of a user's face after the processing of Step S502 (Step S602). Specifically, the user state change detection unit 120 acquires the position of the user, the direction of a user's body, and the direction of a user's face from the user state acquisition unit 106, and causes the memory 104 to store the acquired position of the user, direction of a user's body, and direction of a user's face. For the acquisition of the direction of a user's body, common techniques, such as a detection method based on user's skeleton information, may be used. For the acquisition of the direction of a user's face, a common facial recognition technique may be used.

Next, the user state change detection unit 120 acquires the previous position of the user, direction of a user's body, and direction of a user's face (Step S604). Specifically, the user state change detection unit 120 acquires the position of the user, the direction of a user's body, and the direction of a user's face previously stored in the memory 104.

Next, the user state change detection unit 120 judges whether or not the position of the user, the direction of a user's body, or the direction of a user's face has changed (Step S606). Specifically, the user state change detection unit 120 compares the acquired position of the user, direction of a user's body, or direction of a user's face with the previous position of the user, direction of a user's body, or direction of a user's face, and then judges whether or not the position of the user, the direction of a user's body, or the direction of a user's face has changed. For the judgment of the change in the direction of a user's body and the direction of a user's face, the threshold value of the change amount may be used. For example, the user state change detection unit 120 judges that the direction of a user's body or the direction of a user's face has changed when the direction of a user's body or the direction of a user's face has changed with an angle larger than a predetermined angle. Therefore, the change in the direction of a user's body or the direction of a user's face whose change amount is smaller than the threshold value is treated as "no change", which can prevent the termination of applications caused by frequently performing the application terminating judging processing.

When it is judged that the position of the user, the direction of a user's body, or the direction of a user's face has changed in Step S606, the control unit 108 judges that the execution of the application terminating judging processing is to be performed, and then performs the processing of each of Step S204 to Step S210. When it is judged that the position of the user, the direction of a user's body, or the direction of a user's face has not changed in Step S606, the control unit 108 judges that the execution of the application terminating judging processing is not to be performed, and then terminates the processing.

Thus, according to the first modification of this embodiment, the control unit 108 judges whether or not the application terminating judging processing is performed based on the change in the direction of a user's body or the direction of a user's face. Therefore, the application terminating judging processing is performed based on the change in the direction of a user's body or the direction of a user's face having a possibility of a change in the visual direction, whereby even in the case where the information processing device 100-3 does not have a user's gaze detection function, the information processing device 100-3 can respond to the change in a user's visual direction.

(Second Modification)

Figure 11:
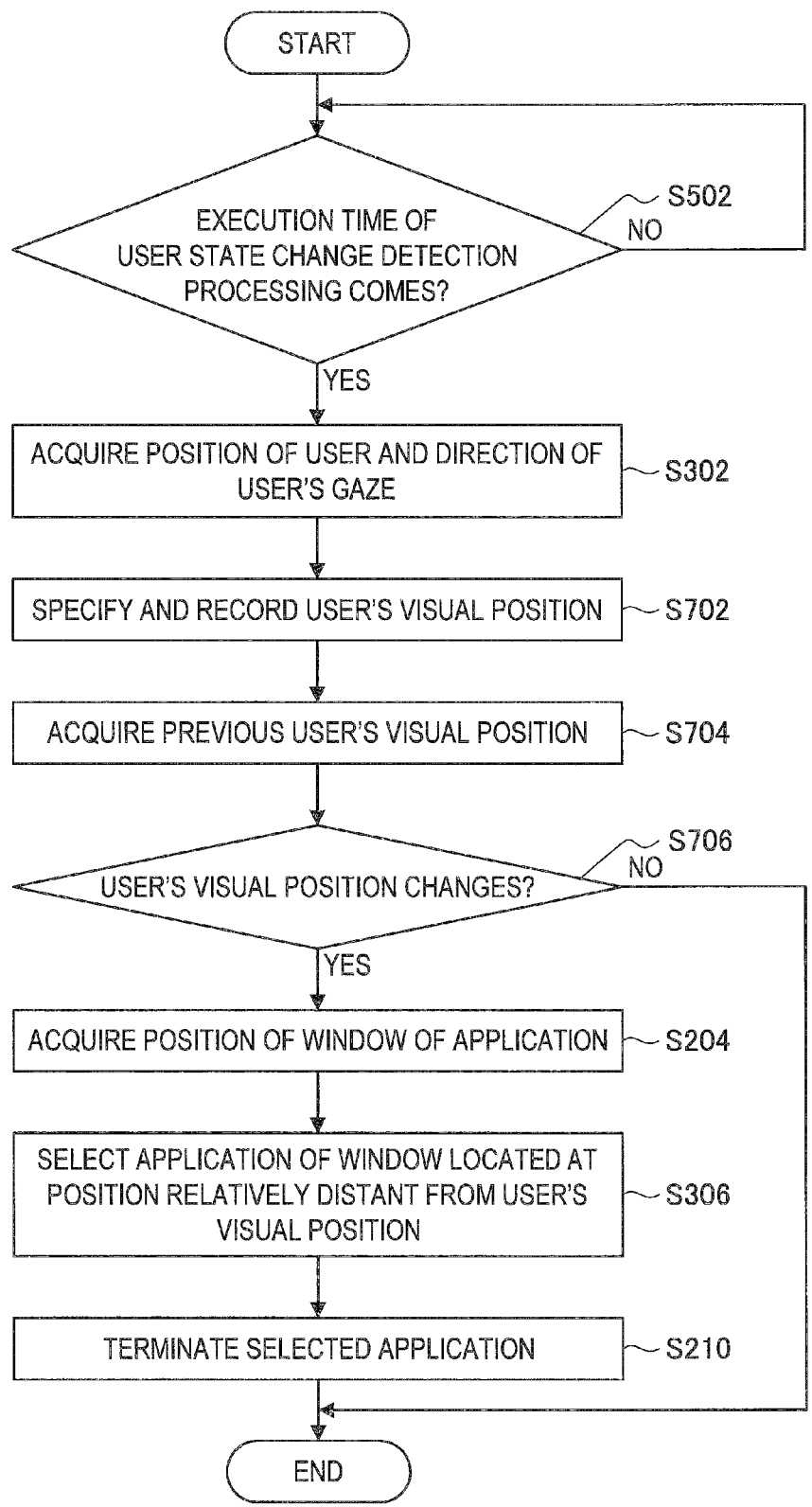
FIG. 11 is a flow chart conceptually illustrating the processing of an information processing device in a second modification of the second embodiment of the present disclosure.

As a second modification of this embodiment, the control unit 108 may judge whether or not the application terminating judging processing is performed based on the change in the direction of a user's gaze acquired by the user state acquisition unit 106. A specific description is given with reference to FIG. 11. FIG. 11 is a flow chart conceptually illustrating the processing of an information processing device 100-2 in the second modification of the second embodiment of the present disclosure. A description duplicated with the description of the first and second embodiments is omitted.

The user state change detection unit 120 specifies and records the visual position of the user after the processing of each of Step S502 and Step S302 (Step S702). Specifically, the user state change detection unit 120 specifies the visual position of the user based on the acquired position of the user and direction of a user's gaze.

Next, the user state change detection unit 120 acquires the previous visual position of the user (Step S704). Specifically, the user state change detection unit 120 acquires the visual position of the user previously stored in the memory 104.

Next, the user state change detection unit 120 judges whether or not the visual position of the user has changed (Step S706). Specifically, the user state change detection unit 120 compares the acquired visual position of the user and a previous visual position of the user, and then judges whether or not the visual position of the user has changed. For the judgment of the change in the visual position of the user, the threshold value of the change amount may be used. For example, the user state change detection unit 120 judges that the visual position of the user has changed when the distance of the visual position of the user change is larger than a predetermined distance. Therefore, the change in the visual position of the user whose change amount is smaller than the threshold value is treated as "no change", which can prevent the termination of applications caused by frequently performing the application terminating judging processing.

When it is judged that the visual position of the user has changed in Step S706, the control unit 108 judges that the execution of the application terminating judging processing is to be performed, and then performs the processing of each of Step S204 to Step S210.

When it is judged that the visual position of the user has not changed in Step S706, the control unit 108 judges that the execution of the application terminating judging processing is not to be performed, and then terminates the processing.

Thus, according to the second modification of this embodiment, the control unit 108 judges whether or not the application terminating judging processing is performed based on the change in the direction of a user's gaze. Therefore, an application is terminated reflecting the user's visual state, whereby the accuracy of the processing of specifying an application used by the user can be increased, so that the computational resource can be released without reducing user's convenience.

(Third Modification)

Figure 12:
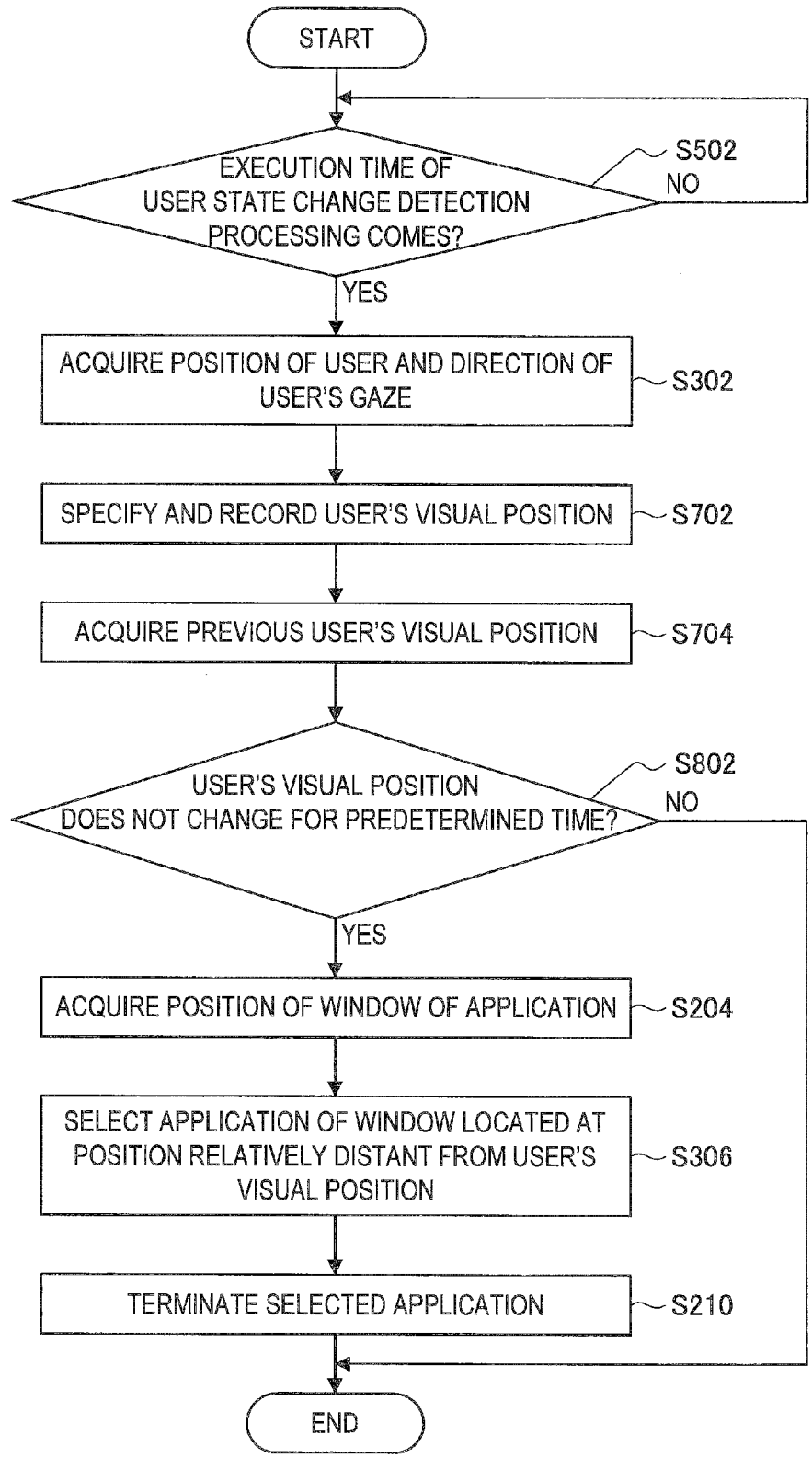
FIG. 12 is a flow chart conceptually illustrating the processing of an information processing device in a third modification of the second embodiment of the present disclosure.

As a third modification of this embodiment, the control unit 108 may judge whether or not the application terminating judging processing is performed when the direction of a user's gaze acquired by the user state acquisition unit 106 is fixed for a predetermined time. A specific description is given with reference to FIG. 12. FIG. 12 is a flow chart conceptually illustrating the processing of the information processing device 100-2 in the third modification of the second embodiment of the present disclosure. A description duplicated with the description of the first and second embodiments is omitted.

After the processing of each of Step S502 to Step S704, the user state change detection unit 120 judges whether or not the visual position of the user does not change for a predetermined time (Step S802). Specifically, the user state change detection unit 120 compares a specified visual position of the user and each of the visual positions stored until the time going back by only a predetermined time from the present time, and then judges whether or not the visual position of the user has changed. When it is not judged in all the visual positions among the respective previous visual positions that the visual position of the user has changed, the user state change detection unit 120 judges that the visual position of the user does not change for a predetermined time. When it is judged in one or more visual positions among the respective previous visual positions that the visual position of the user has changed, the user state change detection unit 120 judges that the visual position of the user has changed before a predetermined time has passed.

When it is judged that the visual position of the user does not change for a predetermined time in Step S802, the control unit 108 judges that the execution of the application terminating judging processing is to be performed, and then performs the processing of each of Step S204 to Step S210. When it is judged that the visual position of the user has changed before a predetermined time has passed in Step S802, the control unit 108 judges that execution of the application terminating judging processing is not to be performed, and then terminates the processing.

Thus, according to the third modification of this embodiment, the control unit 108 judges whether or not the application terminating judging processing is performed when the direction of a user's gaze acquired by the user state acquisition unit 106 is fixed for a predetermined time. Therefore, the application terminating judging processing is performed in response to a gazing action of a user who may start the use of an application, whereby the release of the computational resource according to a user's used state can be achieved.

4. Third Embodiment (Example of Processing Based on User's Identification Information)

The second embodiment of the present disclosure is described above. Next, a third embodiment of the present disclosure is described. In the third embodiment of the present disclosure, an information processing device 100-3 performs the application terminating judging processing based on user's identification information.

Figure 13:
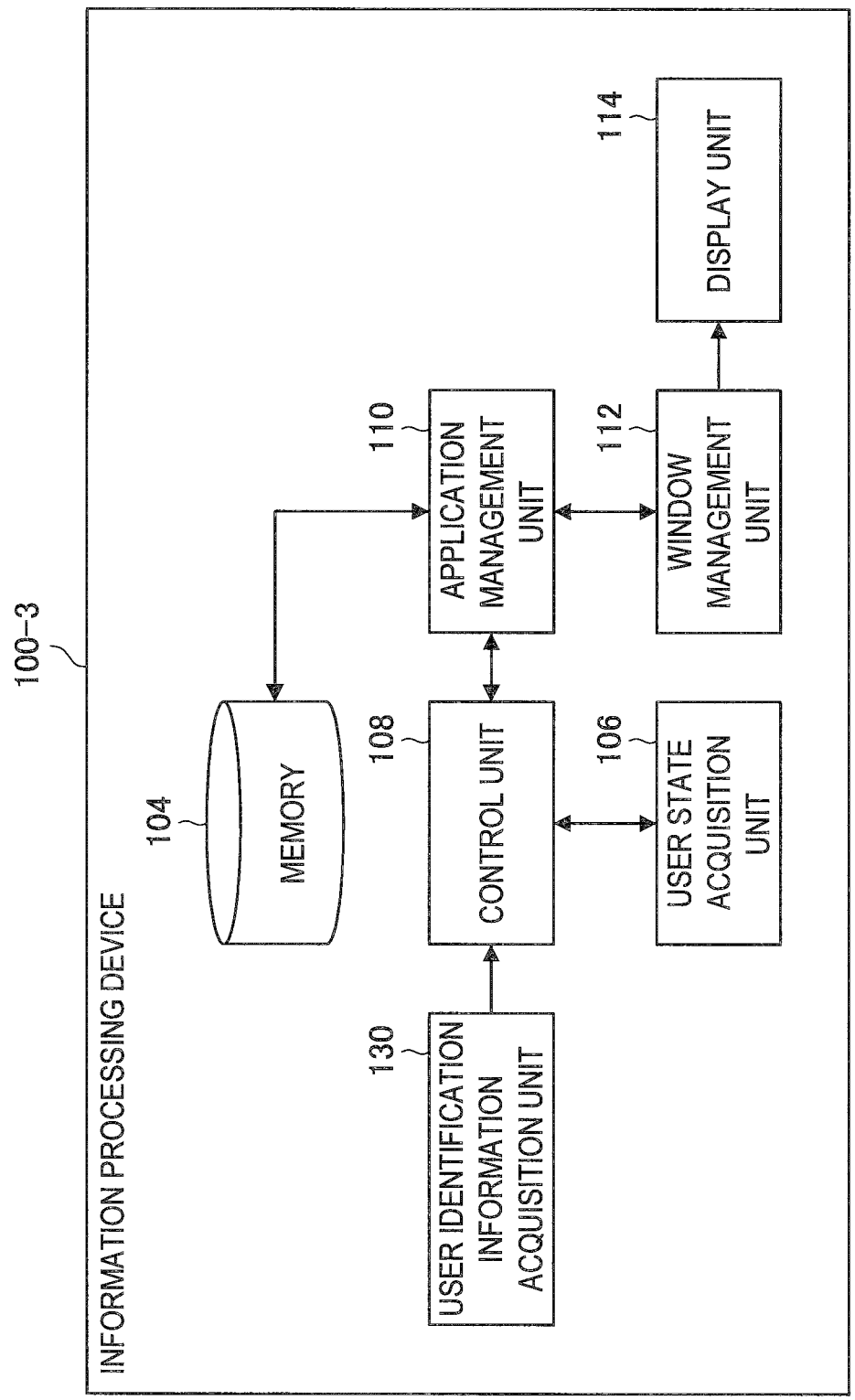
FIG. 13 is a block diagram illustrating the schematic functional configuration of an information processing device according to a third embodiment of the present disclosure.

4-1. Configuration of Information Processing Device According to Third Embodiment First, the configuration of the information processing device 100-3 according to the third embodiment of the present disclosure is described with reference to FIG. 13. FIG. 13 is a block diagram illustrating the schematic functional configuration of the information processing device 100-3 according to the third embodiment of the present disclosure. A description of a configuration substantially the same as the configuration of the information processing device 100-1 according to the first embodiment and the configuration of the information processing device 100-2 according to the second embodiment of the present disclosure is omitted.

As illustrated in FIG. 13, the information processing device 100-3 further has a user identification information acquisition unit 130 in addition to the memory 104, the user state acquisition unit 106, the control unit 108, the application management unit 110, the window management unit 112, and the display unit 114.

The user identification information acquisition unit 130 acquires user's identification information capable of identifying a user who uses the information processing device 100-3. Specifically, the user identification information acquisition unit 130 performs an analysis using a facial recognition technique of an image obtained by imaging by an imaging unit separately provided in the information processing device 100-3, and then extracts a user's face to use the same as the user's identification information. When an application is started, the user identification information acquisition unit 130 acquires the user's identification information of a user who has started the application, and then causes the memory 104 to store the acquired user's identification information. The description above gives an example in which the user identification information acquisition unit 130 uses a user's face recognized by the image analysis as the user's identification information but the user identification information acquisition unit 130 may be a communication unit which acquires the user's identification information from a device provided outside the information processing device 100-3. The user identification information acquisition unit 130 may be a reading unit which reads the user's identification information from the RFID (Radio Frequency Identification) tag and the like of a user.

Figure 14:
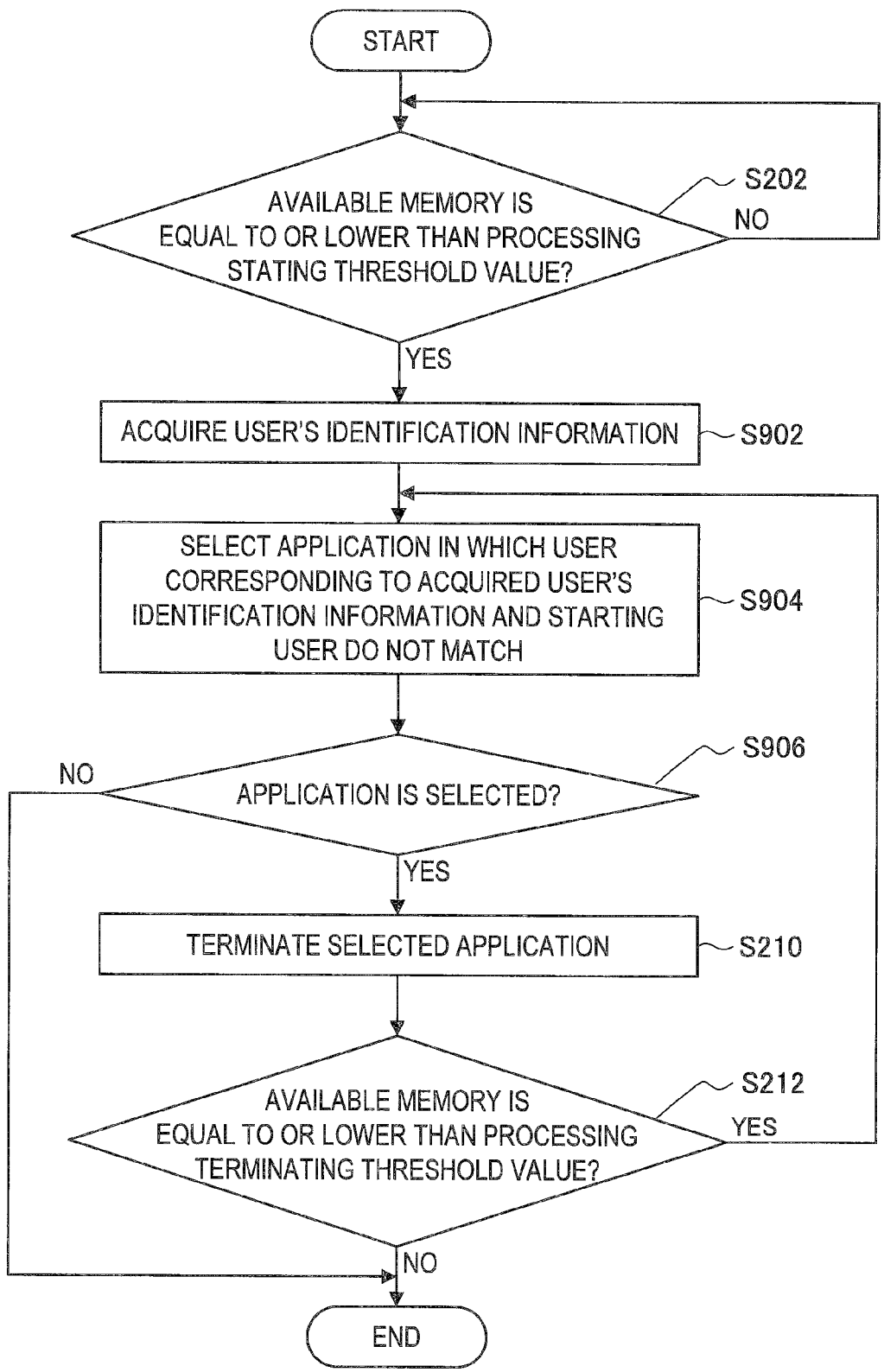
FIG. 14 is a flow chart conceptually illustrating the processing of the information processing device in the third embodiment of the present disclosure.

4-2. Processing of Information Processing Device According to Third Embodiment Next, the processing of an information processing device 100-3 in a third embodiment of the present disclosure is described with reference to FIG. 14. FIG. 14 is a flow chart conceptually illustrating the processing of the information processing device 100-3 in the third embodiment of the present disclosure. A description duplicated with the description of the first and second embodiments is omitted.

When the available memory becomes equal to or lower than the processing starting threshold value in Step S202, the control unit 108 acquires user's identification information (Step S902). Specifically, the control unit 108 acquires the user's identification information of a user who uses the information processing device 100-3 from the user identification information acquisition unit 130.

Next, the control unit 108 selects an application in which the user specified by the acquired user's identification information and the starting user do not match with each other (Step S904). Specifically, the control unit 108 acquires the user's identification information of the user who has started the application stored in the memory 104, and then selects an application in which the user's identification information of the starting user and the acquired user's identification information do not match with each other. For example, the control unit 108 may judge the matching of the user's identification information employing the matching rate of the features of user's faces and the like.

Next, the control unit 108 judges whether or not an application has been selected (Step S906). Specifically, the control unit 108 judges whether or not an application has been selected in Step S904.

When it is judged that an application has been selected in Step S906, the control unit 108 executes the processing of each of Step S210 and Step S212. When it is judged that an application has not been selected, the control unit 108 terminates the processing.

Thus, according to the third embodiment of the present disclosure, the information processing device 100-3 terminates an application in which the user who uses the information processing device 100-3 and the user who has started the application do not match with each other. Therefore, the computational resource can be released without reducing user's convenience during use.

4-3. Modification in Third Embodiment

The third embodiment of the present disclosure is described above. This embodiment is not limited to the above-described example. Hereinafter, a modification of this embodiment is described.

As the modification of this embodiment, when the position of a window of an application specified based on the user's identification information satisfies predetermined conditions, the control unit 108 may terminate the application. For example, the control unit 108 selects an application based on the user's identification information, and then acquires the position of a window relating to the selected application from the application management unit 110. The control unit 108 acquires the position of a user relating to the user's identification information acquired from the user state acquisition unit 106. Then, when the distance from the position of the window relating to the selected application to the position of the user is longer than a predetermined distance, the control unit 108 terminates the application.

Thus, according to the modification of this embodiment, when the position of the window of the application specified based on the user's identification information satisfies the predetermined conditions, the control unit 108 terminates the application. Therefore, an application other than an application which may be used by a user who is not the starting user is likely to be terminated, whereby the computational resource can be released without reducing user's convenience.

5. Hardware Configuration of Information Processing Apparatus According to Embodiment of Present Disclosure Embodiments of the present disclosure are described above. The processing of the information processing device 100 described above is implemented by cooperation between software and hardware of the information processing device 100 described below.

FIG. 15 is a diagram for describing the hardware configuration of the information processing device 100 according to an embodiment of the present disclosure. As illustrated in FIG. 15, the information processing device 100 contains a central processing unit (CPU) 142, a read only memory (ROM) 144, a random access memory (RAM) 146, a bridge 148, a bus 150, an interface 152, an input device 154, an output device 156, a storage device 158, a drive 160, a connection port 162, and a communication device 164.

The CPU142 functions as an arithmetic processing unit and a control unit and cooperates with various programs to thereby realize the operations of the resource monitoring unit 102, the user state acquisition unit 106, the control unit 108, the application management unit 110, the window management unit 112, the user state change detection unit 120, and the user identification information acquisition unit 130 in the information processing device 100. The CPU142 may be a microprocessor. The ROM144 stores programs, operation parameters, or the like to be used by the CPU142. The RAM146 temporarily stores programs for use in the execution of the CPU142, parameters which change as appropriate in the execution, and the like. By the ROM144 and the RAM146, a part of the memory 104 in the information processing device 100 is realized. The CPU142, the ROM144, and the RAM146 are connected to each other through an internal bus constituted by a CPU bus and the like.

The input device 154 is constituted by an input unit which allows the user to input information, such as a mouse, a keyboard, a touch panel, a button, a microphone, a camera, a switch, and a lever, an input control circuit which generates an input signal based on an input by the user, and then outputs the signal to the CPU 142, and the like. The user of the information processing device 100 can operate the input device 154 to input various data to the information processing device 100 or instruct the information processing device 100 to perform a processing operation.

The output device 156 is an example of the display unit 114 of the information processing device 100, and performs an output operation to a device, such as a liquid crystal display (LCD), an organic light emitting diode (OLED), and a lamp. Furthermore, the output device 156 may include a loudspeaker and a headphone for outputting sound.

The storage device 158 is a device for data storage. The storage device 158 may include a storage medium, a recording device for recording data in the storage medium, a reading device for reading the data from the storage medium, and a deleting device for deleting data recorded in the storage medium. The storage device 158 stores a program executed by the CPU 142 and various types of data.

The drive 160 is a reader-writer for a storage medium and is built in or externally attached to the image processing device 100. The drive 160 reads out information recorded on a removable storage medium that is attached thereto, such as a magnetic disk, an optical disk, a magneto-optical disk, or a semiconductor memory, and then outputs the information to the RAM 146. The drive 160 is also able to write information to a removable storage medium.

The connection port 162 is a bus for connection with an information processing device or peripheral devices provided outside the information processing device 100. The connection port 162 may be universal serial bus (USB).

The communication device 164 may be a communication interface constituted by a communication device for connection with a network. The communication device 164 may be an infrared communication compatible device, a wireless local area network (LAN) compatible communication device, a long-term evolution (LTE) compatible communication device, or a wired communication device that performs communication through wire.

According to the first embodiment of the present disclosure, an application whose possibility of being used by a user is lower than the possibility of the other applications is likely to be terminated, and therefore the computational resource may be released without reducing user's convenience. According to the second embodiment of the present disclosure, the computational resource can be released according to the application used state of a user. Moreover, applications are terminated irrespective of the used state of the computational resource, whereby a depletion of the computational resource can be suppressed. According to the third embodiment of the present disclosure, the computational resource can be released without reducing user's convenience during use.

As described above, the suitable embodiments of the present disclosure are described in detail with reference to the accompanying drawings but the technical scope of the present disclosure is not limited to the example. It should be understood by those skilled in the art that various modifications, combinations, sub-combinations and alterations may occur depending on design requirements and other factors insofar as they are within the scope of the appended claims or the equivalents thereof.

For example, although the application management unit 110 terminates an application in the above-described embodiments but the present technique is not limited to this example. For example, the termination of an application may include saving information on the state and the like of the application into a memory and the like. Specifically, when an application terminating instruction is provided from the control unit 108, the application management unit 110 may save the information on the application state and the relating data on the memory into an auxiliary storage unit or the like. Therefore, the information on the terminated application is read from the auxiliary storage unit or the like, whereby the application can be resumed in the state before terminating the application. For the above-described processing, it may be selected whether or not the processing is executed. For example, it may be selected to execute the above-described processing or not in each application.

It should be noted that in the present disclosure, the operations described in the flow chart may be performed not only in time series in the described order but in parallel or individually. Further, it should be understood that the operations performed in time series may be performed in a different order from the described order.

Note that the present disclosure is not limited to the effect stated above and in addition to or in place of the effect stated above, may achieve any of the effects indicated in this specification or effects that can be understood from the specification.

Additionally, the present technology may also be configured as below:

(1) An information processing device including:
   an application information acquisition unit which acquires a position of a window on a display screen; and
   a control unit which terminates an application of a window whose position acquired by the application information acquisition unit satisfies a predetermined condition.

(2) The information processing device according to (1) further including:
a user state acquisition unit which acquires a position of a user,
wherein the position of the user acquired by the user state acquisition unit is used for judgment of the predetermined condition.

(3) The information processing devices according to (2), wherein the predetermined condition is a condition that a distance from the position of the window to the position of the user is longer than a distance to be compared.

(4) The information processing device according to (2), wherein the user state acquisition unit further acquires a direction of a user's gaze,
for the judgment of the predetermined condition, the position of the user and the direction of a user's gaze acquired by the user state acquisition unit are used.

(5) The information processing device according to (4), wherein the predetermined condition is a condition that a distance from the position of the window to a visual position specified from the position of the user and the direction of a user's gaze is longer than a distance to be compared.

(6) The information processing device according to any one of (2) to (5),
wherein the application information acquisition unit further acquires input device information which shows an input device having usability to an application, and
the control unit judges whether or not the input device shown by the input device information acquired by the application information acquisition unit is an input device which is unsuitable for use by the user based on the position of the window and the position of a user, and then adds a result of the judgment to an application terminating condition.

(7) The information processing device according to any one of (1) to (6),
wherein the control unit judges whether or not an application satisfies an application terminating condition when a state of a computational resource of the information processing device is in a predetermined state.

(8) The information processing device according to any one of (2) to (6),
wherein the control unit judges a necessity for execution of the judgment of whether or not an application satisfies an application terminating condition based on a change in the position of a user acquired by the user state acquisition unit.

(9) The information processing device according to any one of (2) to (6),
wherein the user state acquisition unit further acquires information on a direction of a user's body or a direction of a user's face, and
the control unit judges a necessity for execution of the judgment of whether or not an application satisfies an application terminating condition based on a change in the direction of a user's body or the direction of a user's face acquired by the user state acquisition unit.

(10) The information processing device according to (4), wherein the control unit judges a necessity for execution of the judgment of whether or not an application satisfies an application terminating condition based on a change in the direction of a user's gaze acquired by the user state acquisition unit.

(11) The information processing device according to (4) or (10),
wherein the control unit judges a necessity for execution of the judgment of whether or not an application satisfies an application terminating condition when the direction of a user's gaze acquired by the user state acquisition unit is fixed for a predetermined time.

(12) The information processing device according to any one of (1) to (11),
wherein the control unit does not perform the judgment of whether or not an application satisfies an application terminating condition for the application which satisfies a predetermined exclusion condition.

(13) The information processing device according to any one of (1) to (12),
wherein the control unit preferentially terminates an application whose window is displayed behind other windows among applications which satisfy an application terminating condition.

(14) The information processing device according to (1), further including:
a user identification information acquisition unit which acquires user's identification information,
wherein the control unit terminates an application specified based on the user's identification information acquired by the user identification information acquisition unit.

(15) The information processing device according to (14), wherein the control unit terminates the specified application when a position of a window of the specified application acquired by the application information acquisition unit satisfies a predetermined condition.

(16) An information processing device including:
an application information acquisition unit which acquires input device information which shows an input device having usability to an application;
a user state acquisition unit which acquires a position of a user; and
a control unit which terminates an application for which an input device shown by the input device information acquired by the application information acquisition unit is judged to be an input device which is unsuitable for use by a user based on the position of the user acquired by the user state acquisition unit.

(17) An information processing method including:
acquiring a position of a window on a display screen; and
terminating an application of a window of which the acquired position satisfies a predetermined condition.

(18) An information processing method including:
acquiring input device information which shows an input device having usability to an application;
acquiring a position of a user; and
terminating an application for which an input device shown by the input device information to be acquired is judged to be an input device which is unsuitable for use by a user based on the acquired position of the user.

What is claimed is:
1. An information processing device, comprising:
an application information acquisition unit configured to acquire positions of a plurality of windows displayed on a display screen; and
a control unit configured to terminate a first application of a first window, of the plurality of windows, on the display screen based on a first distance between a first position of the first window and a second position of a user, wherein the first distance is greater than each of a plurality of first distances between the positions of windows of the plurality of windows, other than the first window, and the second position of the user,
wherein the user is positioned in front of the display screen.

2. The information processing device according to claim 1, further comprising:
a user state acquisition unit configured to acquire the second position of the user.

3. The information processing device according to claim 2,
wherein the user state acquisition unit is further configured to acquire a direction of a gaze of the user, and
wherein the second position of the user and the direction of the gaze of the user are used to terminate the first application of the first window.

4. The information processing device according to claim 3,
wherein the control unit is further configured to terminate a second application of a second window based on a second distance from a third position of the second window to a visual position, wherein the second distance is greater than each of a plurality of second distances from the positions of the windows, other than the second window, to the visual position, and
wherein the visual position is specified from the second position of the user and the direction of the gaze of the user.

5. The information processing device according to claim 3,
wherein the control unit is further configured to determine that the first application of the first window satisfies an application terminating condition based on a change in the direction of the gaze of the user.

6. The information processing device according to claim 3,
wherein the control unit is further configured to determine the first application of the first window satisfies an application terminating condition based on a determination that the direction of the gaze of the user is fixed for a determined time.

7. The information processing device according to claim 2,
wherein the application information acquisition unit is further configured to acquire input device information which indicates an input device that has usability to the first application of the first window, and
wherein the control unit is further configured to:
determine that the input device is unsuitable for use by the user based on the first position of the first window and the second position of the user, and
add a result of the determination to an application terminating condition.

8. The information processing device according to claim 2,
wherein the control unit is further configured to determine a that the first application of the first window satisfies an application terminating condition based on a change in the second position of the user.

9. The information processing device according to claim 2,
wherein the user state acquisition unit is further configured to acquire information on a direction of a body of the user or on a direction of a face of the user, and
wherein the control unit is further configured to determine that the first application of the first window satisfies an application terminating condition based on a first change in the direction of the body of the user or a second change in the direction of the face of the user.

10. The information processing device according to claim 1,
wherein the control unit is further configured to determine that the first application of the first window satisfies an application terminating condition based on a determined state of a computational resource of the information processing device.

11. The information processing device according to claim 1,
wherein the control unit is further configured to halt a determination that the first application of the first window satisfies an application terminating condition based on the first application of the first window that satisfies an exclusion condition.

12. The information processing device according to claim 1,
wherein the control unit is further configured to preferentially terminate the first application of the first window, among a plurality of applications which satisfy an application terminating condition, based on a display of the first window behind the plurality of windows other than the first window.

13. The information processing device according to claim 1, further comprising:
a user identification information acquisition unit configured to acquire identification information of the user,
wherein the control unit is further configured to terminate a specified application based on the identification information of the user.

14. The information processing device according to claim 13,
wherein the control unit is further configured to terminate the specified application based on a third position of a window of the specified application.

15. An information processing device, comprising:
an application information acquisition unit configured to
acquire input device information that indicates an input device that has usability to a plurality of applications displayed on a display screen; and
acquire positions of a plurality of windows displayed on the display screen, wherein the plurality of windows correspond to the plurality of applications;
a user state acquisition unit configured to acquire a position of a user with respect to the display screen; and
a control unit configured to:
terminate a first application associated with a first window of the plurality of windows on the display screen based on a first distance between a first position of the first window and the position of the user, wherein the first distance is greater than a second distance between a second position of at least a second window of the plurality of windows and the position of the user; and
terminate a second application associated with a third window of the plurality of windows on the display screen for which the input device is determined unsuitable for use by the user based on the position of the user.

16. An information processing method, comprising:
acquiring positions of a plurality of windows displayed on a display screen; and
terminating an application of a first window, of the plurality of windows, on the display screen based on a first distance between a first position of the first window and a second position of a user, wherein the first distance is greater than each of a plurality of distances between the positions of windows of the plurality of windows, other than the first window, and the second position of the user, wherein the user is positioned in front of the display screen.

17. An information processing method, comprising:

acquiring input device information that indicates an input device having usability to a plurality of applications displayed on a display screen;

acquiring positions of a plurality of windows displayed on the display screen, wherein the plurality of windows correspond to the plurality of applications;

acquiring a position of a user with respect to the display screen;

terminating a first application associated with a first window of the plurality of windows on the display screen based on a first distance between a first position of the first window and the position of the user, wherein the first distance is greater than a second distance between a second position of at least a second window of the plurality of windows and the position of the user; and terminating a second application associated with a third window of the plurality of windows on the display screen for which the input device is determined unsuitable for use by the user based on the position of the user.

* * * * *